US008896687B2

(12) United States Patent
Kataoka

(10) Patent No.: US 8,896,687 B2
(45) Date of Patent: Nov. 25, 2014

(54) LANE DEPARTURE PREVENTION SUPPORT APPARATUS, METHOD OF DISPLAYING A LANE BOUNDARY LINE AND PROGRAM

(75) Inventor: Hiroaki Kataoka, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 439 days.

(21) Appl. No.: 13/463,431

(22) Filed: May 3, 2012

(65) Prior Publication Data

US 2012/0314055 A1 Dec. 13, 2012

Related U.S. Application Data

(63) Continuation of application No. PCT/JP2011/063170, filed on Jun. 8, 2011.

(51) Int. Cl.
*H04N 7/00* (2011.01)
*G08G 1/16* (2006.01)

(52) U.S. Cl.
CPC .................................... *G08G 1/167* (2013.01)
USPC .......................................................... 348/118

(58) Field of Classification Search
CPC ................................. B60R 1/00; G08G 1/167
USPC ................................................. 348/117, 118
See application file for complete search history.

(56) References Cited

U.S. PATENT DOCUMENTS 5,689,249 A 11/1997 Sakamoto et al.
6,317,057 B1 * 11/2001 Lee .............................. 340/901
6,434,256 B1 * 8/2002 Yeo .............................. 382/104
6,930,593 B2 * 8/2005 Crawshaw .................... 340/435
8,116,523 B2 * 2/2012 Amagasaki ................... 382/103
8,209,123 B2 * 6/2012 Miyazaki ..................... 701/532
2004/0042638 A1 * 3/2004 Iwano ........................... 382/104
2010/0295668 A1 * 11/2010 Kataoka ........................ 340/435
2011/0216944 A1 * 9/2011 Kawasaki et al. ............. 382/104

FOREIGN PATENT DOCUMENTS

| | | |
|---|---|---|
| JP | A-6-276430 | 9/1994 |
| JP | A-8-175299 | 7/1996 |
| JP | A-2005-130613 | 5/2005 |
| JP | A-2007-125968 | 5/2007 |
| JP | A-2007-125969 | 5/2007 |
| JP | A-2007-328410 | 12/2007 |
| JP | A-2008-27046 | 2/2008 |
| WO | WO 2008/107944 A1 | 9/2008 |

OTHER PUBLICATIONS

Jul. 19, 2011 International Search Report issued in International Patent Application No. PCT/JP2011/063170 (with translation).

* cited by examiner

*Primary Examiner* — Sath V Perungavoor
*Assistant Examiner* — James Pontius
(74) *Attorney, Agent, or Firm* — Oliff PLC

(57) ABSTRACT

A lane departure prevention support apparatus comprises: imaging means for capturing an image of a lane boundary line which defines a traveling lane; vehicle position detecting means for recognizing the lane boundary line in a recognition area of captured image data to detect a host vehicle position within the traveling lane in a width direction; assisting means for performing driver assist using the recognition result of the lane boundary line; displaying means for displaying the recognition result of the lane boundary line; and recognition result display controlling means for displaying an unrecognized lane boundary line according to the host vehicle position, if one of left and right white lines is not recognized, wherein a display of the unrecognized lane boundary line is not such a display which indicates that the lane boundary line is not recognized.

11 Claims, 20 Drawing Sheets

FIG.19A

LEFT WHITE LINE: RECOGNIZED STATUS

RIGHT WHITE LINE: RECOGNIZED STATUS

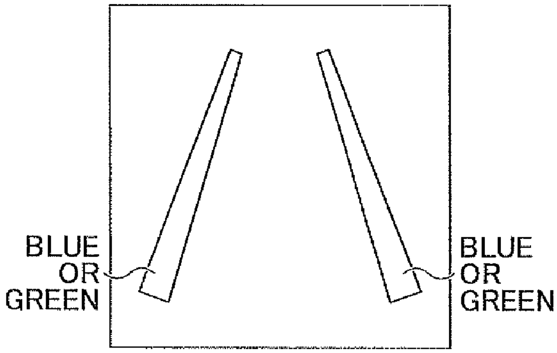

FIG.19D

LEFT WHITE LINE: RECOGNIZED STATUS

RIGHT WHITE LINE: RECOGNIZED STATUS

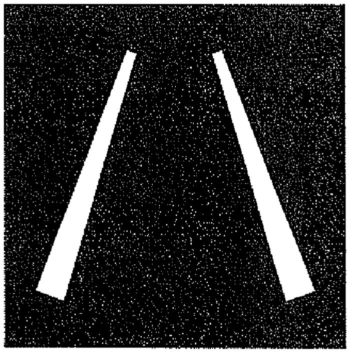

FIG.19B

LEFT WHITE LINE: IDENTIFIED UNRECOGNIZED STATUS

RIGHT WHITE LINE: RECOGNIZED STATUS

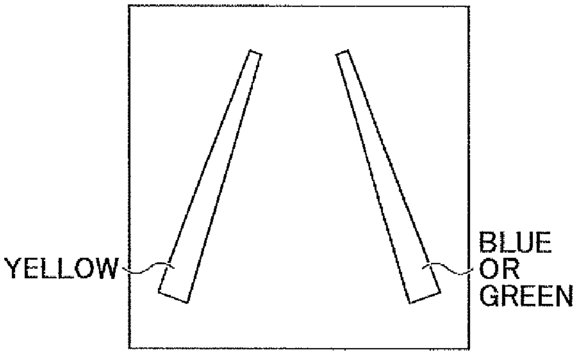

FIG.19E

LEFT WHITE LINE: IDENTIFIED UNRECOGNIZED STATUS

RIGHT WHITE LINE: RECOGNIZED STATUS

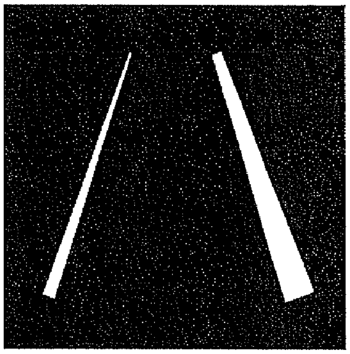

FIG.19C

LEFT WHITE LINE: UNRECOGNIZED STATUS

RIGHT WHITE LINE: RECOGNIZED STATUS

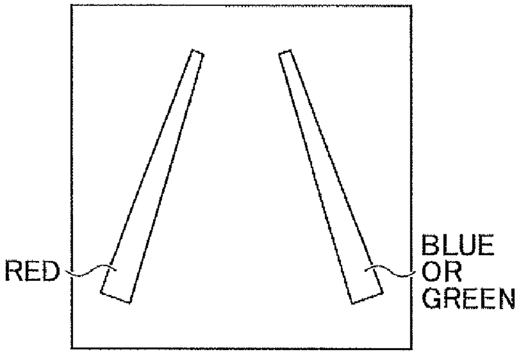

FIG.19F

LEFT WHITE LINE: UNRECOGNIZED STATUS

RIGHT WHITE LINE: RECOGNIZED STATUS

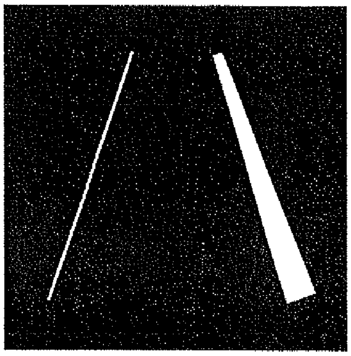

FIG.20A

LEFT WHITE LINE: RECOGNIZED STATUS

RIGHT WHITE LINE: RECOGNIZED STATUS

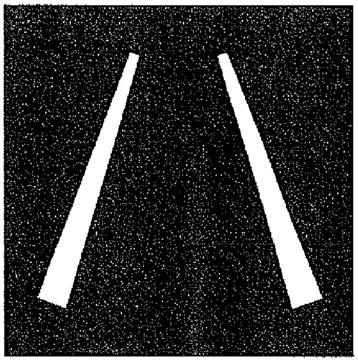

FIG.20B

LEFT WHITE LINE: IDENTIFIED UNRECOGNIZED STATUS

RIGHT WHITE LINE: RECOGNIZED STATUS

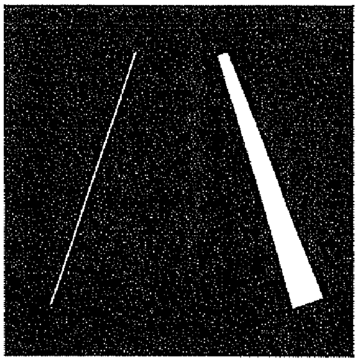

FIG.20C

LEFT WHITE LINE: UNRECOGNIZED STATUS

RIGHT WHITE LINE: RECOGNIZED STATUS

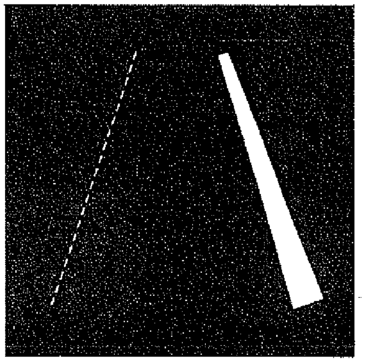

FIG.20D

LEFT WHITE LINE: RECOGNIZED STATUS

RIGHT WHITE LINE: RECOGNIZED STATUS

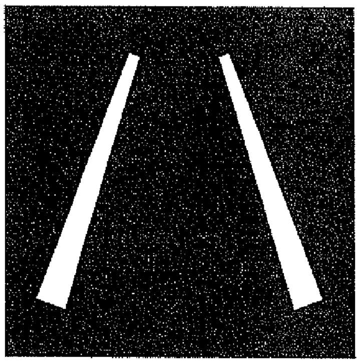

FIG.20E

LEFT WHITE LINE: IDENTIFIED UNRECOGNIZED STATUS

RIGHT WHITE LINE: RECOGNIZED STATUS

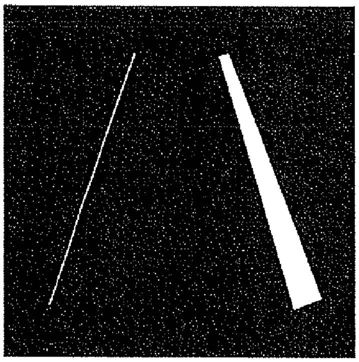

FIG.20F

LEFT WHITE LINE: UNRECOGNIZED STATUS

RIGHT WHITE LINE: RECOGNIZED STATUS

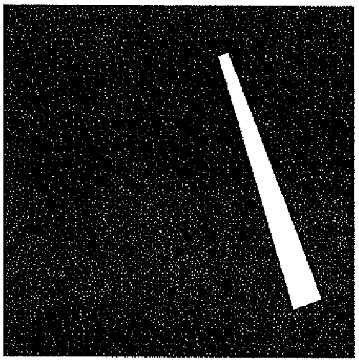

LANE DEPARTURE PREVENTION SUPPORT APPARATUS, METHOD OF DISPLAYING A LANE BOUNDARY LINE AND PROGRAM

CROSS-REFERENCE TO RELATED APPLICATIONS

This is a continuation of International Application No. PCT/JP2011/063170, filed on Jun. 8, 2011, the entire contents of which are hereby incorporated by reference.

FIELD

The present invention is related to a lane departure prevention support apparatus for assisting for prevention of a departure from a traveling lane according to a host vehicle position within the traveling lane, and in particular, a lane departure prevention support apparatus which displays a recognition status of a lane boundary line.

BACKGROUND

A lane departure warning apparatus (LDW: Lane Departure Warning) which outputs a warning when the departure from the traveling lane is predicted, and a lane keeping assist apparatus (LKA: Lane Keeping Assist) which adds a steering force for traveling at a center of the traveling lane are known. In these apparatuses, white lines are recognized using a camera and an image processor installed in a vehicle.

In the LDW/LKA, it is general practice to notify a driver of a current operation status of the LDW/LKA (see Patent Document 1, for example). This is because there is a case in which the output of the warning or the lane keeping assistance is not performed, depending on a white line recognition status, for example, even if a switch of the LDW/LKA is turned on. Patent Document 1 discloses a white line display apparatus for a vehicle for displaying a white line icon on the display device in which the white line icon is displayed in a solid white if the white line is recognized by white line recognition means and the white line icon is displayed in outline if the white line is not recognized by white line recognition means.

FIG. 1A illustrates an example of a display status of the white line if the white line is recognized in the LDW/LKA, and an example of a display status of the white line if the white line is not recognized in the LDW/LKA. The recognition status of the white line is displayed as the white line icon on the display device such as a liquid crystal display. For example, the white line icon is displayed in a bold manner if the white line is recognized and white line icon is displayed in a slender manner so that a driver can understand that the white line is not recognized. If the white line is not recognized, the LDW/LKA cannot predict the departure from the traveling lane to output the warning and add the steering force for traveling at the center of the lane.

The reasons why the white line is not recognized include cases where a road surface sign does not exist, the white line is patchy or unclear due to hard rainfall, a wiper device operates in a high speed mode, the driver performs a predetermined operation such as a lane change, etc.

As illustrated in FIG. 1A, by notifying the driver of the fact that the LDW/LKA does not operate, it is possible to prevent the driver from overtrusting the LDW/LKA. In other words, it is possible to prevent the driver from expecting an excessive performance of the LDW/LKA, thereby notifying the driver that there is a limit of the assistance in a status where the white line is not recognized. Further, it is possible to notify the driver of the fact that there may be a case where the LDW/LKA does not operate normally when a view field of a camera is shielded due to an undesirable position of an inspection sticker or an antenna for ETC (Electronic Toll Collection).

There are some vehicles in which the LDW/LKA can perform the lane departure warning or the lane keeping assist even if the left or right white line is not recognized. There may be a case in which driver assistance can be performed to some degree even if one of the left and right white lines is recognized, which is required to comply with a safety requirement depending on countries (NCAP (New Car Assessments Program) in USA). Thus, even if one of the left and right white lines is not recognized, it is preferred that the display device displays the white line icon to notify the driver.

FIG. 1B illustrates an example of a display status of the white line if only the right white line is recognized, and FIG. 1C illustrates an example of a display status of the white line if only the left white line is recognized. As illustrated in FIGS. 1B and 1C, the LDW/LKA can notify the driver of the white line recognition status by displaying the recognized white line in a bold manner and the unrecognized white line in a outline manner.

However, as illustrated in FIGS. 1B and 1C, there is a problem that displaying only the recognized one of the white lines in a bold manner leads to a deviation with respect to the recognition by the driver. Specifically, when the vehicle travels in the lane such that the vehicle is biased to the right or left white line, one of the white lines (the white line opposite to the closer white line) goes out of a white line recognition area due to a limit of the angle of view of the camera or the white line recognition area (i.e., an image processing area) and thus one of the white lines, which goes out of the white line recognition area, becomes unrecognized. However, even in this case, since the right and left white lines are in the view of the driver, there may be a case where the driver wonders why one of the white lines is not recognized.

FIG. 2A is a diagram for illustrating an example of the angle of view of the camera. As illustrated in FIG. 2A, for the purpose of the image processing such as the white line recognition, the LDW/LKA uses only the white lines in a predetermined area in front of the vehicle and within the angle of view. The farther end of the area is few tens meters away from the vehicle so that the accuracy of the white line recognition can be maintained, while the nearer end of the area is about ten meters from the vehicle which is within the angle of view and not shielded by a hood or the like. If the angle of view can be enlarged, the LDW/LKA can recognize the white line from the nearer distance, thereby preventing a situation in which only the farther white line is not recognized when the vehicle becomes closer to one of the white lines.

However, even if the angle of view is enlarged, the number of the pixels doesn't change in the camera as a whole. Therefore, the number of the pixels of the white lines is reduced when the angle of view is enlarged and thus the image processing accuracy for the farther scene is reduced. In this case, accuracy in calculating curve radius or a curvature of the lane, in particular, is reduced.

Further, the camera of the LDW/LKA is often shared with other driver assist apparatuses which require the image processing for the farther scene. For example, an automatic high beam apparatus, which automatically switches a beam pattern of front headlamps between a high beam pattern and a low beam pattern, uses the camera to detect a preceding vehicle and an oncoming vehicle at a few hundreds of meters ahead of the vehicle and switch the beam pattern. For this reason, it is not desirable to reduce the detection accuracy of the preceding vehicle and the oncoming vehicle by enlarging the angle of view. Further, for a pedestrian detecting apparatus which calls attention to the driver when it detects a pedestrian, if the pedestrian at the farther distance cannot be detected, the output of the call for attention may be delayed. Thus, it is not desirable to reduce the detection accuracy of the pedestrian by enlarging the angle of view. For such reasons, the camera (lens) with a relatively narrow angle of view is adopted in the LDW/LKA not to reduce the image processing accuracy for the farther scene.

FIG. 2B is a diagram for illustrating an example of a limitation on white line recognition areas. In general, a calculation load for the image processing such as the white line recognition is relatively high. On the other hand, areas in which the white lines exist are a right side and a left side of the image rather than a center. Thus, in order to reduce the processing load, the LDW/LKA recognizes the white lines only from a minimum necessary predetermined area (left and right white line recognition areas). In this way, since there is such a limitation on the white line recognition area, there may be a case where the white line does not exist in the left or right white line recognition area if the vehicle travels in the lane such that the vehicle is biased to the right or left white line.

FIGS. 3A and 3B are diagrams for illustrating a situation in which the left white line is out of the left white line recognition area. As illustrated in FIG. 3A, when the vehicle becomes closer to the right white line, the left white line becomes out of the left white line recognition area as illustrated in FIG. 3B. Thus, according to prior art, when the vehicle becomes closer to the right white line, such a white line icon as illustrated in FIGS. 1B and 1C are merely displayed, which leads to strange feelings of the driver.

[Patent Document 1] Japanese Laid-open Patent Publication No. 2007-125968

SUMMARY

Therefore, an object of the present invention is to provide a lane departure prevention support apparatus which can notify the driver of a status in which one of the white lines is recognized.

The present invention is related to a lane departure prevention support apparatus which includes imaging means for capturing an image of a lane boundary line which defines a traveling lane; vehicle position detecting means for recognizing the lane boundary line in a recognition area of captured image data to detect a host vehicle position within the traveling lane in a width direction; assisting means for assisting for prevention of a departure from the traveling lane using the recognition result of the lane boundary line; displaying means for displaying the recognition result of the lane boundary line; and recognition result display controlling means for displaying an unrecognized lane boundary line according to the host vehicle position, if one of left and right white lines is not recognized, wherein a display of the unrecognized lane boundary line is not such a display which indicates that the unrecognized lane boundary line is not recognized.

BRIEF DESCRIPTION OF DRAWINGS

FIGS. 19A through 19F are diagrams for illustrating examples of the different white line icons of the identified unrecognized status, a recognized status and an unrecognized status.

FIGS. 20A through 20F are diagrams for illustrating examples of the different white line icons of the identified unrecognized status, a recognized status and an unrecognized status.

DESCRIPTION OF EMBODIMENTS

In the following, embodiments will be described by referring to the accompanying drawings.

[First Embodiment]

FIGS. 4A through 4D are diagrams for illustrating examples of a display manner of a white line icon according to a white line recognition status. In the present embodiment, a white line recognition status includes the following three statuses which are mainly described hereinafter.

(a) Recognized status (left and right recognized status)

(b) Identified unrecognized status (left identified unrecognized status, and right identified unrecognized status)

(c) Unrecognized status (left unrecognized status, and right unrecognized status)

The recognized status corresponds to a status in which the white line is recognized, and the unrecognized status corresponds to a status in which the white line is not recognized. The identified unrecognized status corresponds to a status in which the further white line is out of a white line recognition area of image data and thus is not recognized because the vehicle becomes close to one of the left and right white lines. Thus, the identified unrecognized status is a special status in the unrecognized status.

It is noted that as another display manner of a white line icon, there is also a warning operating status.

(d) Warning operating status

The first three statuses (the recognized status, the identified unrecognized status and the unrecognized status) depend on the white line recognition status of the camera while the warning operating status corresponds to a status in which the vehicle departs from the lane. It is noted that the status in which the vehicle departs from the lane includes a status in which the departure from the traveling lane is predicted and as status in which the departure from the traveling lane actually occurs.

Figure 1A:
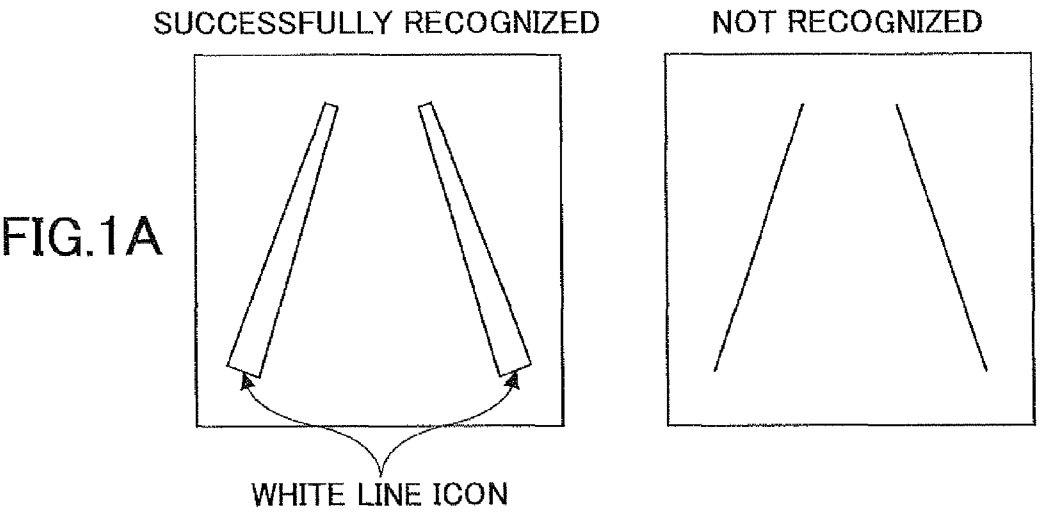
FIGS. 1A, 1B and 1C are diagrams for illustrating an example of a display status of the white line if the white line is recognized in the LDW/LKA, and examples of a display status of the white line if the white line is not recognized in the LDW/LKA.
Figure 1B:
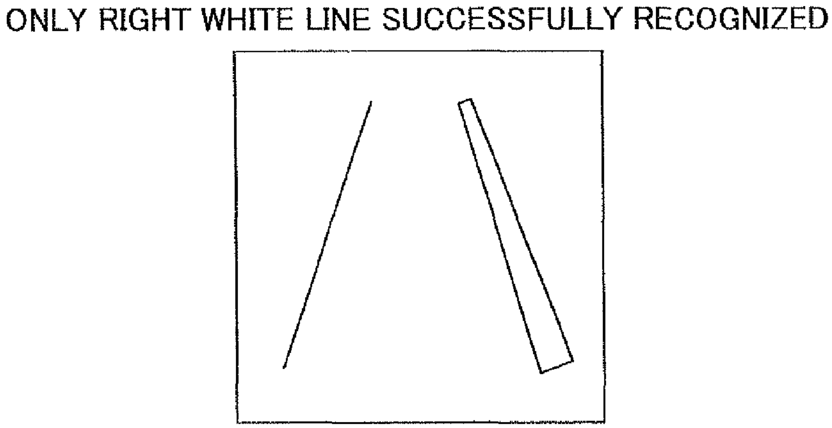
Figure 1C:
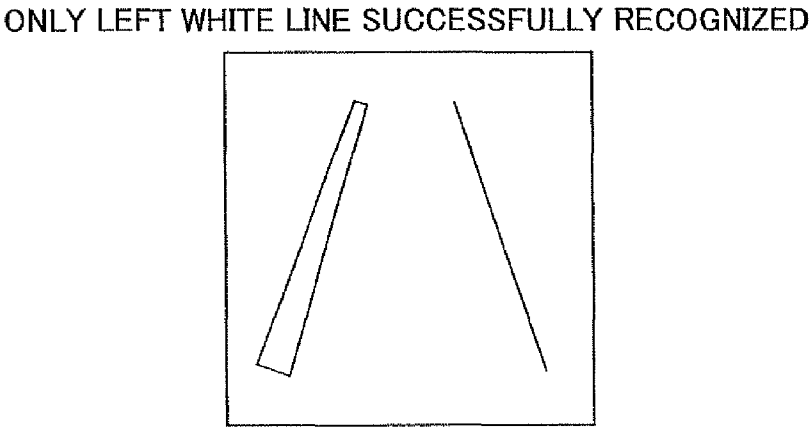
Figure 2A:
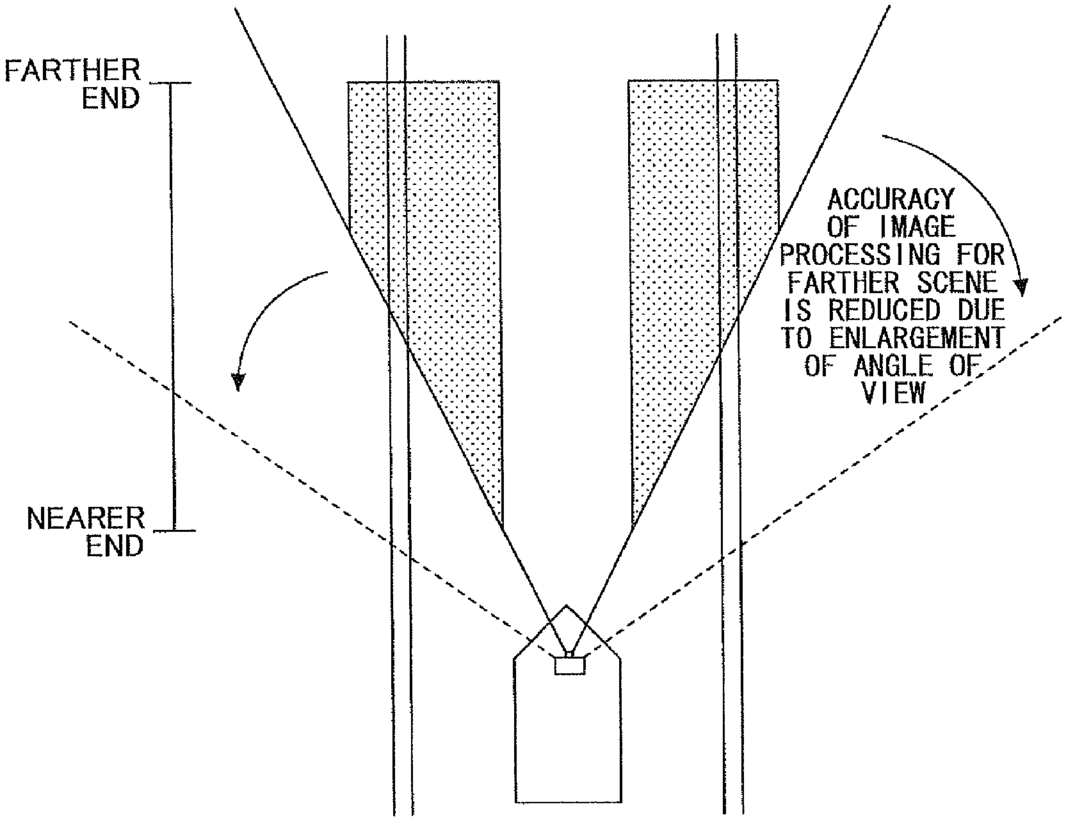
FIGS. 2A and 2B are diagrams for illustrating an example of the angle of view of the camera.
Figure 2B:
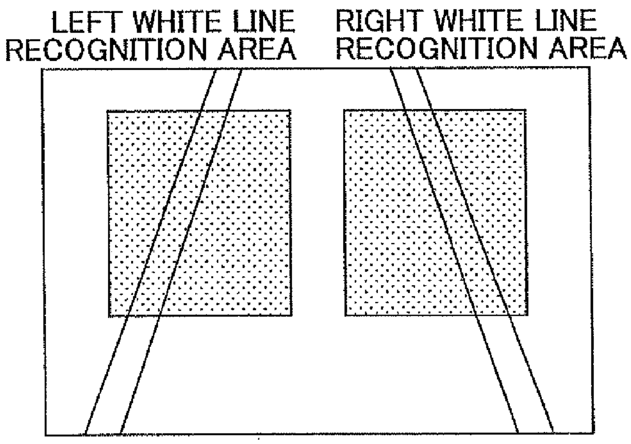
Figure 3A:
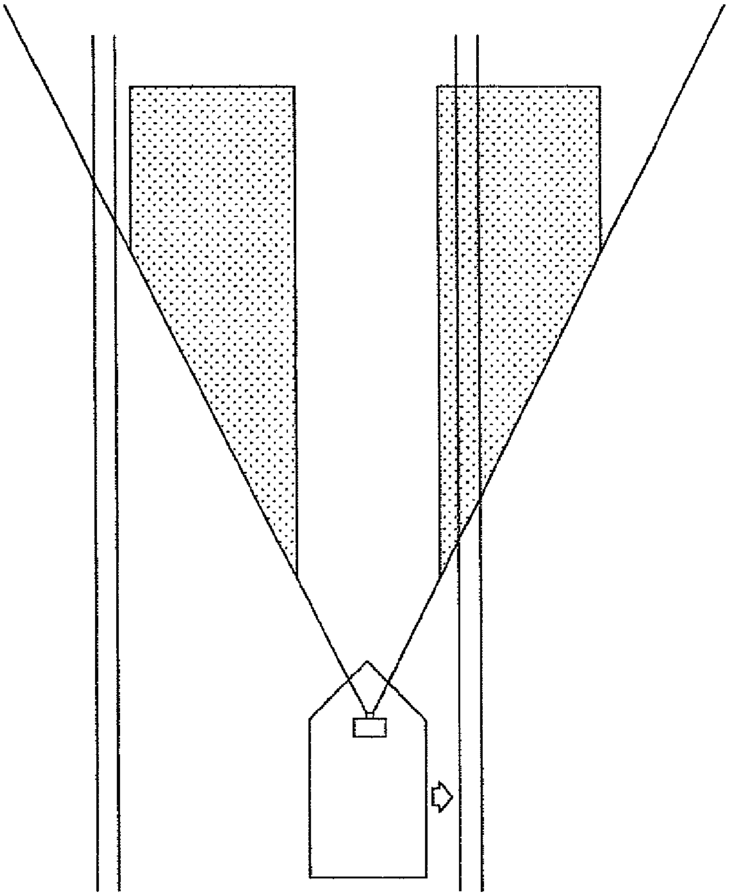
FIGS. 3A and 3B are diagrams for illustrating a situation in which the left white line is out of the left white line recognition area.
Figure 3B:
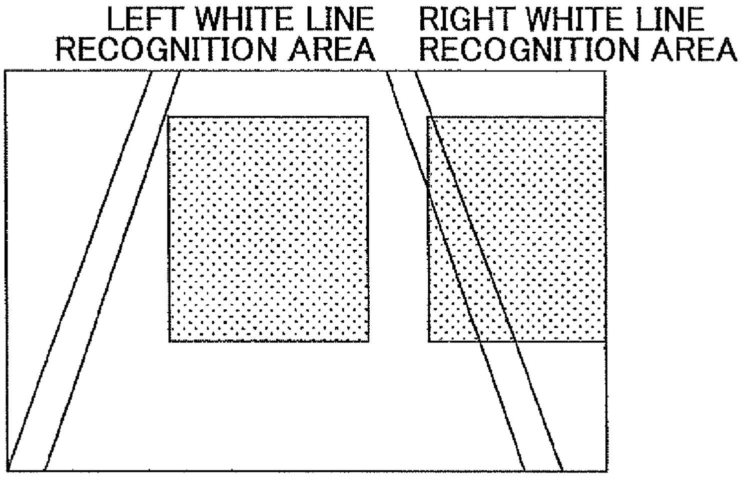
Figure 4A:
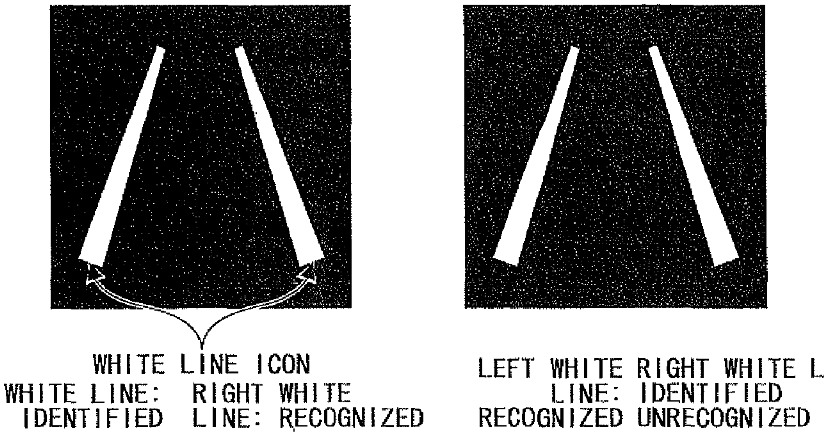
FIGS. 4A through 4D are diagrams for illustrating examples of a display manner according to a white line recognition status.
Figure 4B:
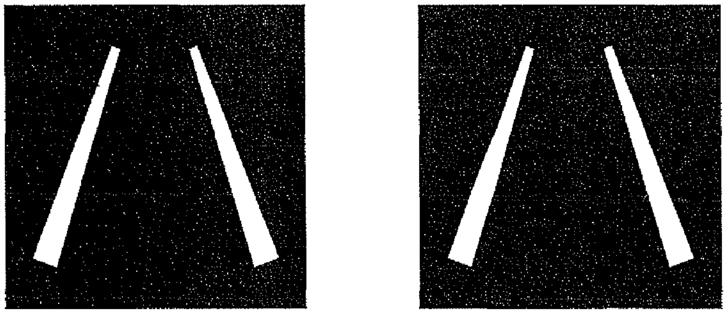
Figure 4C:
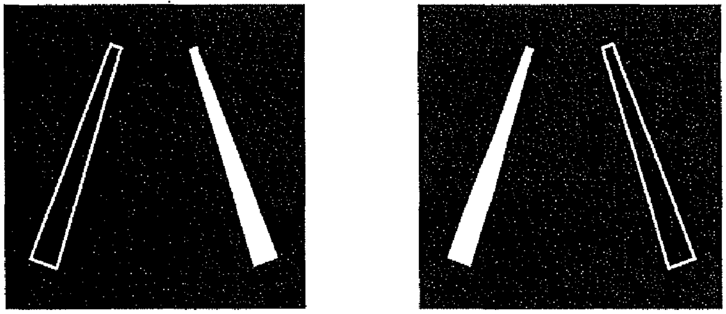

As illustrated in FIG. 4A, in the recognized status, the left and right white lines are displayed using a white line icon which is white in a black background. Further, as illustrated in FIG. 4C, in the unrecognized status, the unrecognized white line is displayed using a white line icon whose inside is removed and thus only the frame (outline) thereof is left white. To the contrary, as illustrated in FIG. 4B, in the identified unrecognized status, the white icon is displayed as is the case with the recognized status. In other words, the white line icon used in the recognized status is displayed for the white line which is not actually recognized. Since a driver can see the white line on the side the vehicle approaches and the white line on the opposite side, it is possible to reduce the strange feeling of the driver by displaying the white line icon in the identified unrecognized status in the same manner as that in the recognized status even if the lane departure prevention support apparatus cannot recognize the white line.

Figure 4D:
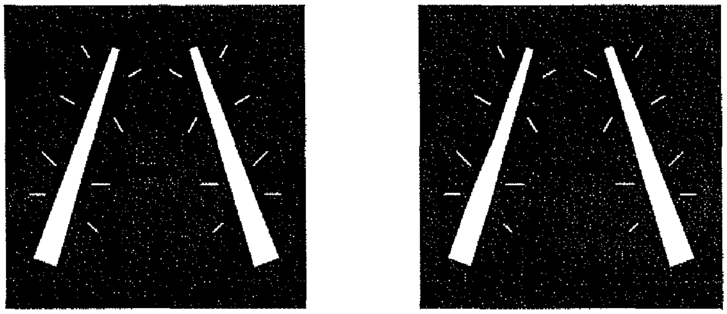

Further, in the warning operating status, as illustrated in FIG. 4D, the white line icon is flashed on and off. The white line icon in the warning operating status may be displayed in any manner as long as it differs from those in the recognized status, the identified unrecognized status and the unrecognized status and has a high attention attracting effect. For example, the white line icon in the warning operating status may be switched between white and black colors, a display area as a whole may be flashed on and off, or the color of the white line icon may be switched at short time intervals.

In FIG. 4D, the white line icon in the warning operating status is displayed in the same manner between a case where the vehicle departs from the lane crossing the right white line and a case where the vehicle departs from the lane crossing the left white line; however, the white line icon in the warning operating status may changes between these cases. For example, if the vehicle departs from the lane crossing the right white line, only the right part of the white line icon may be flashed on and off, and if the vehicle departs from the lane crossing the left white line, only the left part of the white line icon may be flashed on and off.

It is note that the white line in the present embodiment corresponds to a lane boundary line which defines a lane (traveling lane) in which the vehicle travels, and it does not necessarily have white color when it is viewed by unaided eyes of the driver. Thus, the white line includes any lane boundary line which has other colors such as yellow and orange. Further, the color of the white line is not necessarily visible if it can be captured by the camera using infrared rays or ultraviolet rays. Further, even if one of the left and right white lines or both white lines may be formed not in a solid line but in a dotted line on a road surface, these lines are merely referred to as white lines.

[Configuration Example]

Figure 5:
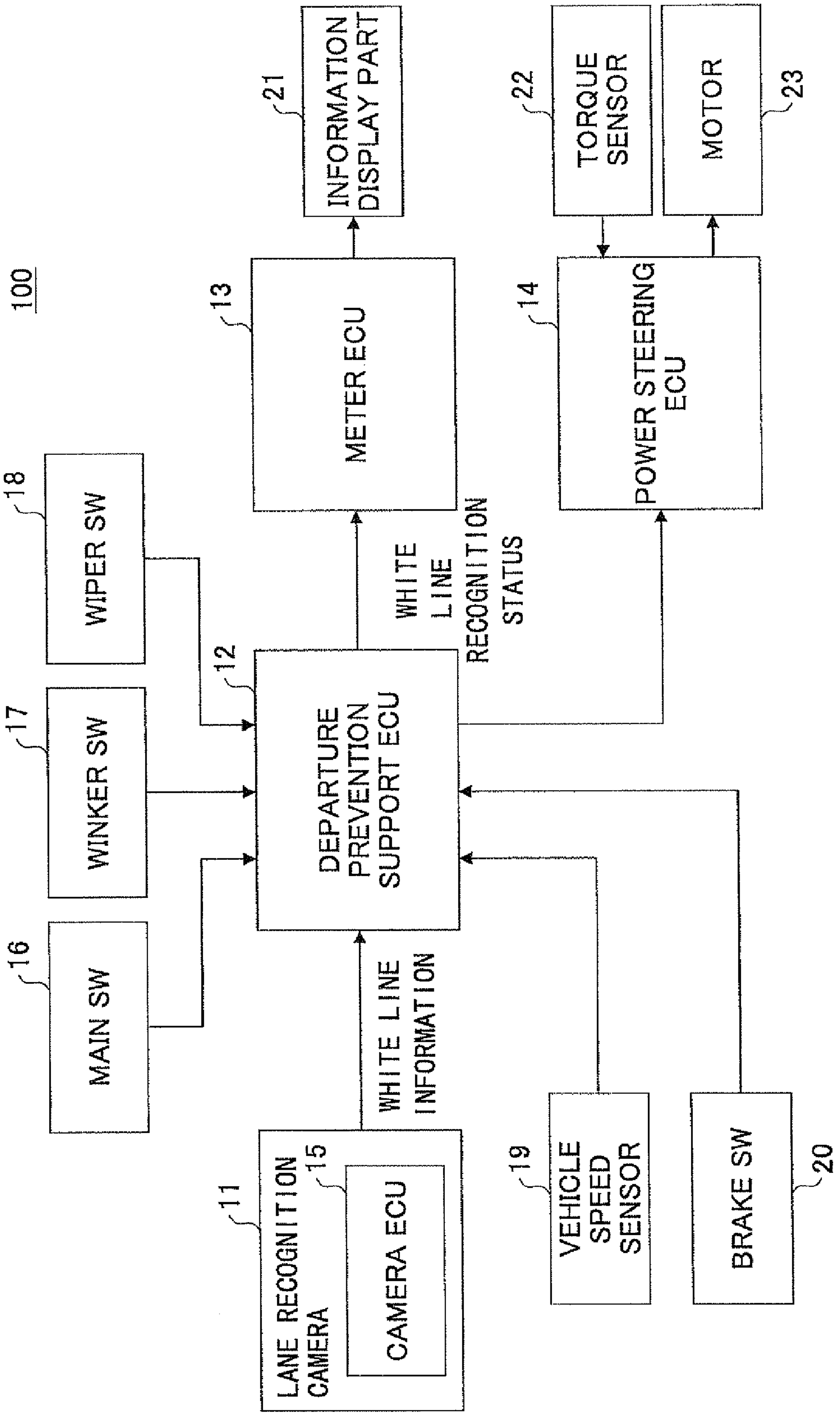
FIG. 5 is a diagram for illustrating an example of a configuration of a lane departure prevention support apparatus.

FIG. 5 is a diagram for illustrating an example of a configuration of a lane departure prevention support apparatus 100 according to the present embodiment. The lane departure prevention support apparatus 100 is controlled by a departure prevention support ECU (Electronic Control Unit) 12. The departure prevention support ECU 12 is coupled to a lane recognition camera 11, a meter ECU 13, a power steering ECU 14, etc., via a vehicle-mounted network such as CAN (Controller Area Network) and FlexRay (and via a gateway apparatus if necessary) such that they can communicate. Further, a vehicle speed sensor 19, a brake SW 20, a winker SW 14 and a wiper SW 18 are illustrated; however, these are often coupled thereto via ECUs (not illustrated). It is noted that the lane departure prevention support apparatus starts to operate when the main SW 16 is turned on.

The lane recognition camera 11 is provided at the substantially center in a width direction of the vehicle, in front of a room mirror, for example, such that its optical axis is directed to lower than a horizontal direction. The lane recognition camera 11 captures an image in a predetermined angle range in front of the vehicle. The lane recognition camera 11 captures and outputs image data with photoelectric conversion elements such as CMOS and COD every cycle time (for example, 30 through 60 frames per sec). In order to make the white line recognition easier, it is desirable for the lane recognition camera 11 to have sensitivity to the near infrared light which is reflected at the white line illuminated by the headlamps.

The lane recognition camera 11 is configured such that it is integral with the camera ECU 15 which performs image processing of the image data captured successively to recognize the left and right white lines which are painted on the road to define the traveling lane. In the following, the lane recognition camera 11 and the camera ECU 15 are described such that they are not distinguished in particular.

[LDW/LKA]

Figure 6A:
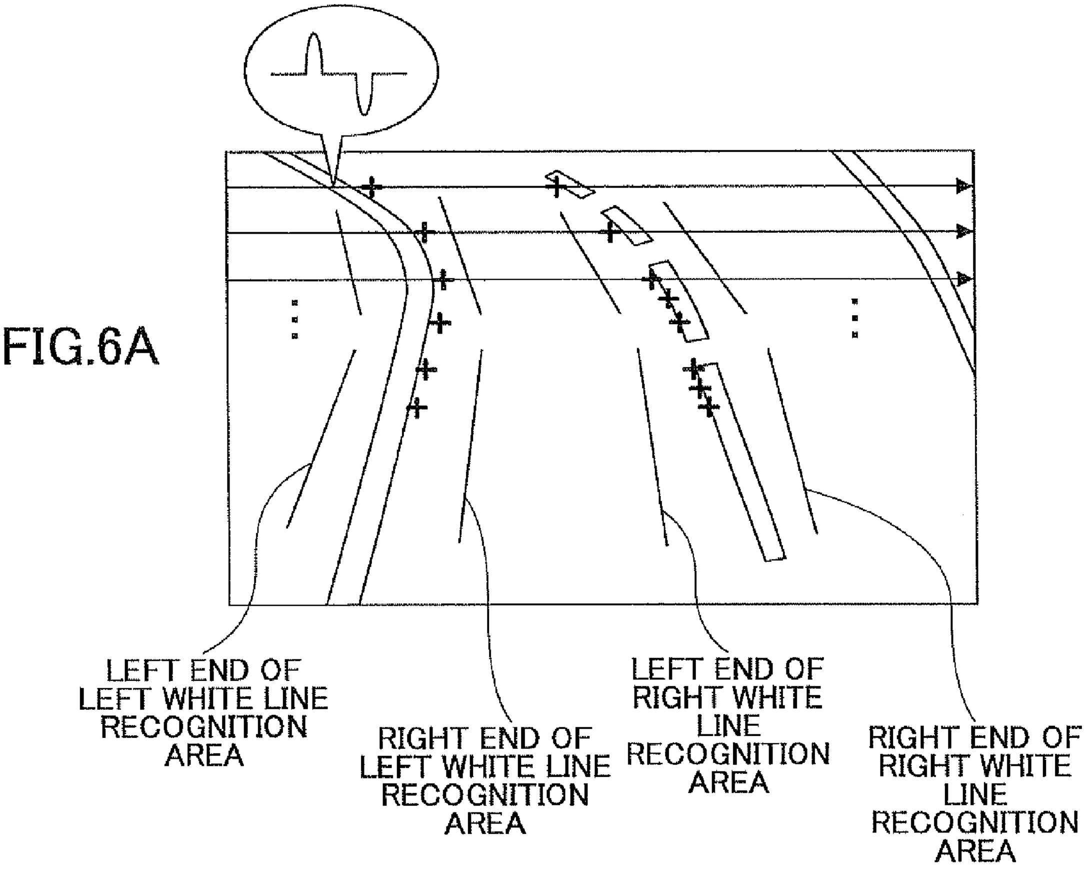
FIGS. 6A and 6B are diagrams for illustrating recognition of the white line and white line information.
Figure 6B:
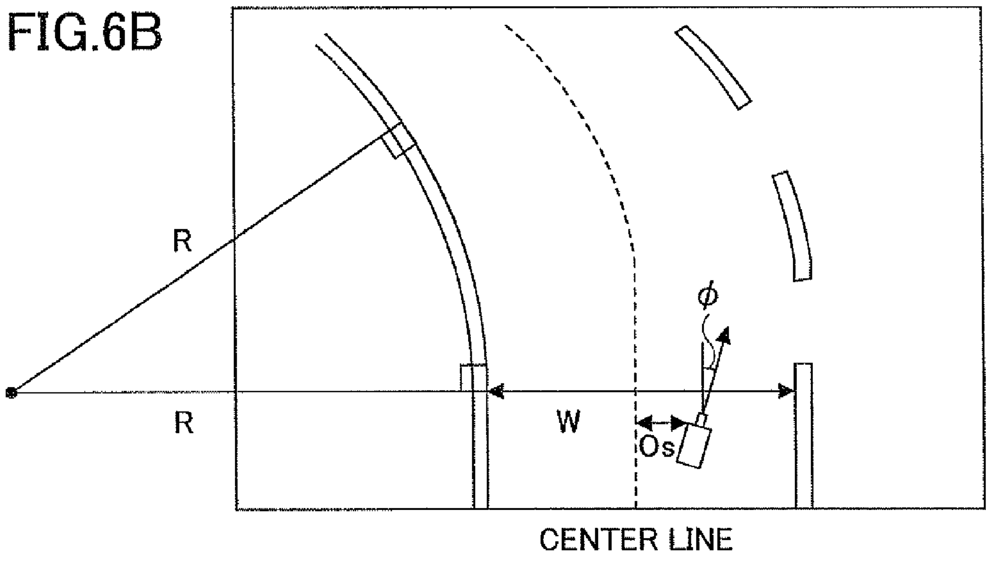

FIGS. 6 and 6B are diagrams for illustrating recognition of the white line and white line information. There are various ways of recognizing the white line. For example, one of known ways uses edge components of opposite ends of the white line. When edge strengths are detected by differentiation of luminance values of the image data in a horizontal direction, edges are detected at the opposite ends of the white line at which the edge strengths exceed a threshold. The lane recognition camera 11 evaluates a probability of the white line to determine whether the white line is recognized. For example, the edge strengths detected at the opposite ends and a distance between the ends are tested in terms of whether they are regarded as the white lines. If the probability of the white line is not high enough, it is determined that the white line recognition status is the unrecognized status.

If the probability of the white line is high enough, one of the left and right edges or a center portion between the left and right edges is detected as a white line.

In FIGS. 6A and 6B, inner edges of the white lines (i.e., a left edge of the right white line and a right edge of the left white line) are indicated by marks "+". In this way, the lane recognition camera 11 estimates a edge line of the white line by connecting the edges in a vertical direction of the image data. It is noted that lines disposed on the left and the right sides of the respective left and the right white lines correspond to the left and right ends of the left and right white line recognition areas. These lines are not displayed in practice, the lane recognition camera 11 uses the position of the white line recognition area to recognize the white lines, because the lane recognition camera 11 recognizes the white lines in the white line recognition area.

Next, the lane recognition camera 11 converts coordinates of the edge lines in the image data to plan coordinates defined when real space is viewed vertically. Then, the edge lines are divided into several parts (two parts in the illustrated example) in a vertical direction, and a Hough-conversion is performed for every divided part. Alternatively, the edge lines may be linearly approximated by using a least squares method. When the left and right lines are expressed using linear functions, the lane recognition camera 11 can calculate white line information. First of all, a distance between the left and right lines corresponds to a lane width W. Further, a center line which vertically connects center points between the left and right white lines corresponds to a center line of the left and right white lines. A lane offset position Os can be obtained based on a number of pixels by which a known center pixel of the camera is shifted from the center line. Further, a yaw angle φ is obtained based on how much a null point of the left and right edge lines is shifted from the center of the image. Further, a road radius R of a road on which the vehicle travels corresponds to a distance from the edge line to an intersection of plural lines perpendicular to the divided edge line portions. The lane recognition camera 11 transmits the white line information (the lane width W, the offset position Os, the yaw angle φ and the road radius R, if the left and right white lines are recognized) thus determined to the departure prevention support ECU 12. Further, if one or both of the left and right white lines are not recognized, identification information of the unrecognized white line and unrecognition information are sent to the departure prevention support ECU 12 as the white line information.

It is noted that the method of obtaining the white line information described above is only an example. It is also possible to approximate the edge lines using a model function representing a road shape to obtain the white line information based on coefficients of the model function.

Further, as described hereinafter, in the present embodiment, the lane width W and the offset position Os are used to detect the vehicle position; however, the lane departure prevention support apparatus 100 can obtain the vehicle position and the lane width W using other methods. For example, the vehicle position can be detected by a navigation apparatus which integrates vehicle speeds in the traveling directions to determine the vehicle position. Further, the lane width W can be determined based on road map information or information obtained by the navigation apparatus which communicates with the outside.

Further, a vehicle-mounted laser radar may emit laser to the road surface to calculate a relative position between the white line and the host vehicle. Since the laser is reflected by the white line, it is possible to detect a relative angle or a positional deviation between the white line and the host vehicle based on the detected reflected light from the white line.

Referring to FIG. 5 again, the departure prevention support ECU 12 performs, under a predetermined condition, a lane departure warning (LDW) which outputs a warning when the departure from the traveling lane is predicted, and a lane keeping assist (LKA) which adds a steering force for traveling at a center of the traveling lane.

The condition for operating the LDW/LKA includes the following items.

(a) The main SW is in an ON state.
(b) The vehicle speed is within a predetermined range (which depends on a law or the like).
(c) At least one of the left and right white lines is recognized.
(d) The wiper device does not operate at a speed higher than a certain speed.
(e) The turning signal is not turned on.
(f) A brake pedal is not operated.

When the main SW is turned on, the departure prevention support ECU 12 performs LDW/LKA control after checking that the turning signal is not turned on based on the winker SW 17, the vehicle speed is within the predetermined range based on the vehicle speed sensor 19, the wiper device does not operate at a high speed higher than a certain speed based on the wiper SW 18, the brake pedal is not operated based on the brake SW 20, and at least one of the left and right white lines is recognized by the lane recognition camera 11. Further, the departure prevention support ECU 12 requests the meter ECU 13 to display the white line icon for the unrecognized status if one of the items of the condition is not met, for example. Further, if all the items of the condition are met except for the item related to the recognition of the white line, the departure prevention support ECU 12 notifies the meter ECU 13 of the white line recognition status and requests the meter ECU 13 to display the white line icon according to the white line recognition status. Since the white line recognition status may be different between the left and right white lines, the white line recognition status for each of the left and right white lines is reported to the meter ECU 13 at substantially the same timing.

First of all, with respect to the LOW, the departure prevention support ECU 12 calculates a time taken to reach the white line based on the yaw angle φ, the distance to one of the left and right white lines and the vehicle speed. If the time taken to reach the white line is less than a predetermined value (1 sec, for example), the departure prevention support ECU 12 transmits a buzzer demand to the meter ECU 13 or other ECU which performs control of generation of the buzzer.

Further, the departure prevention support ECU 12 requests the meter ECU 13 to output a visual warning such as flashing the white line icon on and off. Further, with respect to the LKA, the departure prevention support ECU 12 calculates an addition torque which is to be added in a direction opposite to the offset position Os of the white line information and has a magnitude according to the offset position Os, and transmits the calculated amount of addition torque to the power steering ECU 14. The power steering ECU 14 applies the received addition torque to a motor 23, thereby assisting the steering operation of a steering wheel such that the vehicle travels near the center of the traveling lane. The addition torque is proportional to the offset position Os from the center line, for example. It is noted that instead of applying the addition torque to the steering to assist in keeping in the traveling lane, brake forces of the respective wheels may be controlled individually, utilizing the difference between the inner wheels and the outer wheels, to control the traveling direction of the vehicle. The brake forces of the respective wheels are controlled by the brake ECU.

Further, with respect to the lane change by the intentional operation of the driver, the torque sensor 22 detects the steering torque applied by the driver and the power steering ECU 14 reduces the additional torque, which makes an override easy. Further, the intentional operation of the driver for the lane change may also be detected by the winker SW 17. In this case, the addition torque is not applied as described above.

[Detection of Identified Unrecognized Status]

Figure 7A:
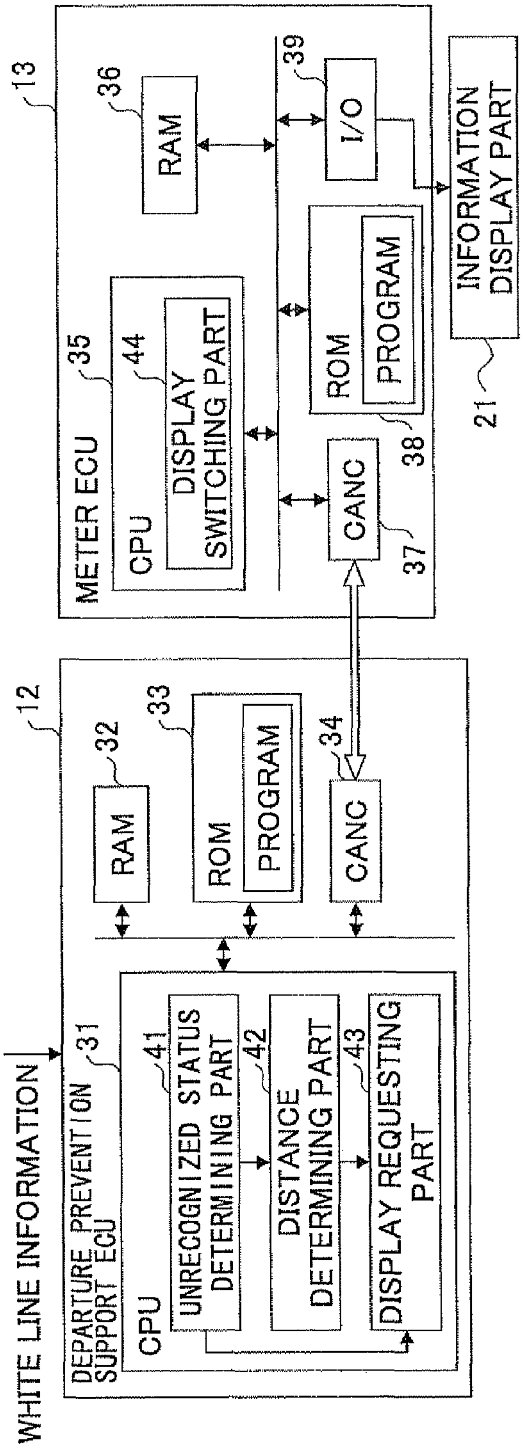
FIGS. 7A and 7B are examples of a functional block diagram of the lane departure prevention support apparatus.
Figure 7B:
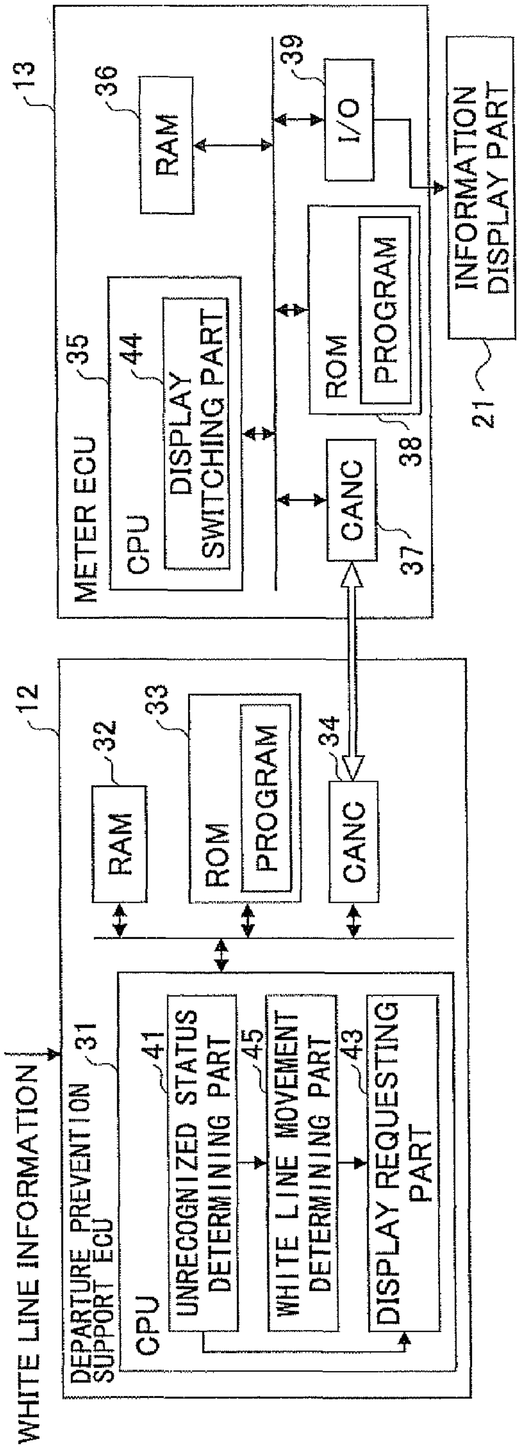

FIGS. 7A and 7B are examples of a functional block diagram of the lane departure prevention support apparatus 100. In FIG. 7A, the ECUs or the like used mainly are illustrated. FIG. 7B is a functional block diagram of another example in which the departure prevention support ECU 12 includes a white line movement determining part 45.

The ECUs such as the departure prevention support ECU 12 and the meter ECU 13 include a microcomputer, a power supply IC, and peripheral circuits such as a monitoring circuit. The departure prevention support ECU 12 includes a CPU 31, a RAM 32, a ROM 33 and a CANC (CAN Controller) 34, for example. The meter ECU 13 includes a CPU 35, a RAM 36, a ROM 38, an I/O 39 and a CANC 37, for example. The CPU 31 of the departure prevention support ECU 12 implements the unrecognized status determining part 41, the distance determining part 42 and the display requesting part 43 by executing programs stored in the ROM 33 and cooperating with the hardware resources. The CPU 35 of the meter ECU 13 implements the display switching part 44 by executing programs stored in the ROM 38 and cooperating with the hardware resources.

The unrecognized status determining part 41 determines whether only one of the left and right white lines becomes unrecognized status based on the white line information. The distance determining part 42 calculates a distance to the unrecognized white line using the offset position Os and the lane width W and compares the distance with a threshold to determine whether the white line recognition status is the identified unrecognized status due to the fact that the vehicle is farther away from one of the white lines (or becomes closer to another of the white lines). The details of the determination are described below.

The white line movement determining part 45 in FIG. 7B determines whether the white line recognition status is the identified unrecognized status utilizing the white line information by detecting that the recognized white line moves out of the white line recognition area. The details of the determination are described below.

The display requesting part 43 notifies the meter ECU 13 of the white line recognition status or the display manner of the white icon via the CANC 34 based on the determination results of the unrecognized status determining part 41, the distance determining part 42 and the white line movement determining part 45. Specifically, the display requesting part 43 functions as follows.

(a) If the left white line is not recognized and the distance to the left white line is greater than or equal to a threshold (i.e., in the case of the identified unrecognized status), the display requesting part 43 notifies the meter ECU 13 that the left white line is in the recognized status. With respect to the right white line, the display requesting part 43 notifies the meter ECU 13 of the white line recognition status according to the recognition result.

(b) If the right white line is not recognized and the distance to the right white line is greater than or equal to a threshold (i.e., in the case of the identified unrecognized status), the display requesting part 43 notifies the meter ECU 13 that the right white line is in the recognized status. With respect to the left white line, the display requesting part 43 notifies the meter ECU 13 of the white line recognition status according to the recognition result.

(c) If the left white line is not recognized and the distance to the left white line is not greater than or equal to a threshold, the display requesting part 43 notifies the meter ECU 13 that the left white line is in the unrecognized status. With respect to the right white line, the display requesting part 43 notifies the meter ECU 13 of the white line recognition status according to the recognition result.

(d) If the right white line is not recognized and the distance to the right white line is not greater than or equal to a threshold, the display requesting part 43 notifies the meter ECU 13 that the right white line is in the unrecognized status. With respect to the left white line, the display requesting part 43 notifies the meter ECU 13 of the white line recognition status according to the recognition result.

The display switching part 44 of the meter ECU 13 switches the display manner of the white line icon displayed on an information display part 21 according to the white line recognition status. It is noted that in the illustrated example, the departure prevention support ECU 12 includes the unrecognized status determining part 41, the distance determining part 42 and the display requesting part 43; a part of or all of the parts may be included in the meter ECU 13 or other ECUs.

[Display Apparatus]

Figure 8:
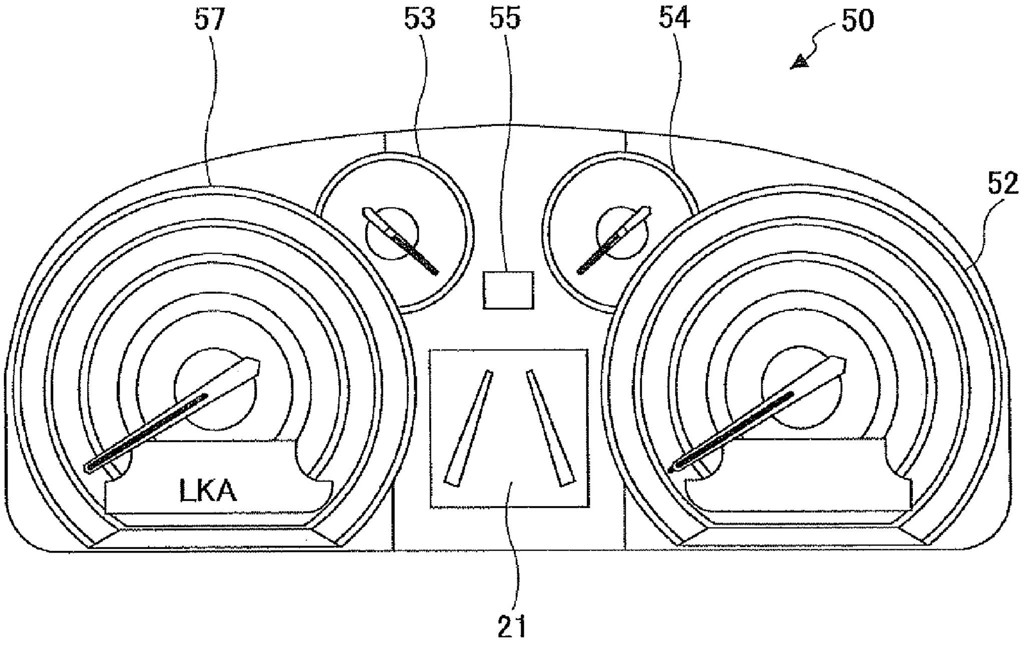
FIG. 8 is a diagram for illustrating an example of a meter panel.

FIG. 8 is a diagram for illustrating an example of a meter panel 50. The meter panel 50 includes a speed meter 52, a tachometer 57, a fuel meter 54, a water temperature meter 53, a shift position displaying part 55 and the information display part 21, etc. In the present embodiment, the white line icon indicating the white line recognition status is displayed on the information display part 21. The white line icon may be displayed on a HUD (Head Up Display) or a liquid crystal display part in a center consol, for example.

The information display part 21 is a multi-information display (a liquid crystal display) of dot type in which plural dots (pixels) are arranged in horizontal and vertical directions. On the information display part 21, a odometer, a trip meter, a momentary fuel efficiency, an average fuel efficiency, a ECO drive indicator, a travelable distance, an outside air temperature, various warnings, etc., are displayed in addition to the white line icon. The information display part 21 may display a white and black image only, a gray image or a color image.

[Examples of White Line Icon]

Figure 9A:
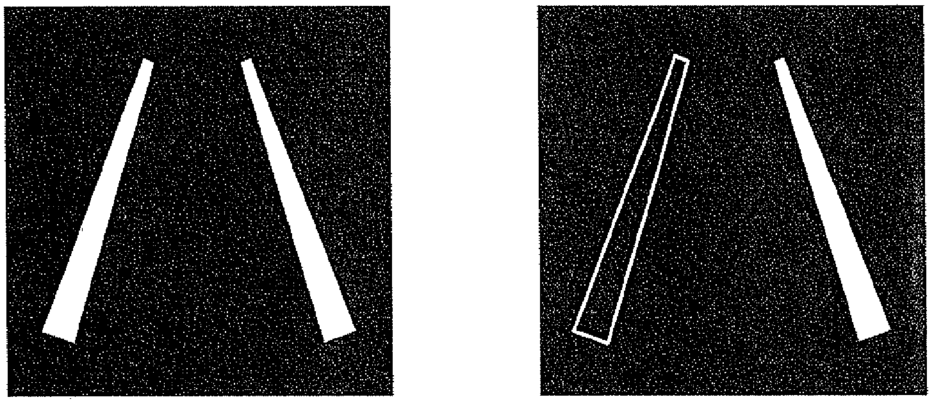
FIGS. 9A and 9B are diagrams for illustrating examples of a display manner of an identified unrecognized status.
Figure 9B:
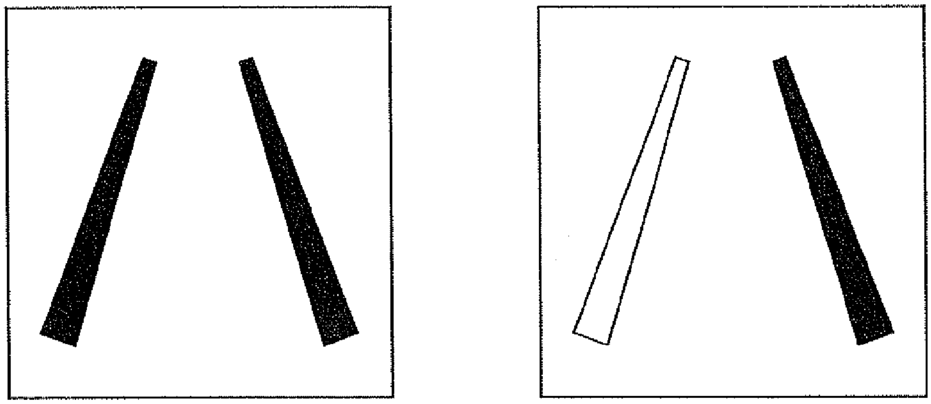

With reference to FIGS. 9A and 9B, the display manner of the white line icon of the identified unrecognized status is described. FIGS. 9A and 9B are diagrams for illustrating examples of the white line icon of the identified unrecognized status.

The lane departure prevention support apparatus 100 of the present embodiment displays the white line icon of the identified unrecognized status differently with respect to the white line icon of the unrecognized status.

In FIG. 9A, the white line icon of the recognized status is solid white in a black background, while the white line icon of the unrecognized status is a white outline in a black background. To the contrary, the display manner of the identified unrecognized status is the same as that of the recognized status (i.e., the white line icon which is solid white in a black background).

Further, as illustrated in FIG. 9B, white and black may be reversed in the background and the white line icon. In FIG. 9B, the white line icon of the recognized status is solid black in a white background, while the white line icon of the unrecognized status is a black outline in a white background. To the contrary, the display manner of the identified unrecognized status is the same as that of the recognized status (i.e., the white line icon which is solid black in a white background).

The identified unrecognized status is a status in which the white line is unrecognized but recognized in terms of a field of view of the driver. To the contrary, the unrecognized status is a status in which the driver easily understands the reason why the white line is unrecognized, such as a status in which a status of the white line is bad or it rains. Thus, since the departure prevention support ECU 12 displays the white line icon differently between the recognized status and the unrecognized status, and displays the same white line icon in the recognized status and the identified unrecognized status, the driver can feel consistency with respect to the driver's own recognition, thereby reducing the strange feeling of the driver. Further, there is also advantage that the driver can easily remember the meaning of the white line in comparison with a configuration in which a dedicated white line icon is prepared for the identified unrecognized status. In this way, according to the present embodiment, one of the features is that the white line icon of the recognized status is used for the white line which is not recognized by the lane recognition camera 11.

[Operation Procedure]

In the followings, two examples of a method for determining the identified unrecognized status are described. In the following, a case where the vehicle becomes closer to the right white line (i.e., the left white line becomes out of the left white line recognition area) is assumed as an example; however, a case where the vehicle becomes closer to the left white line is substantially the same (i.e., a left and right relationship is merely reversed).

Figure 10:
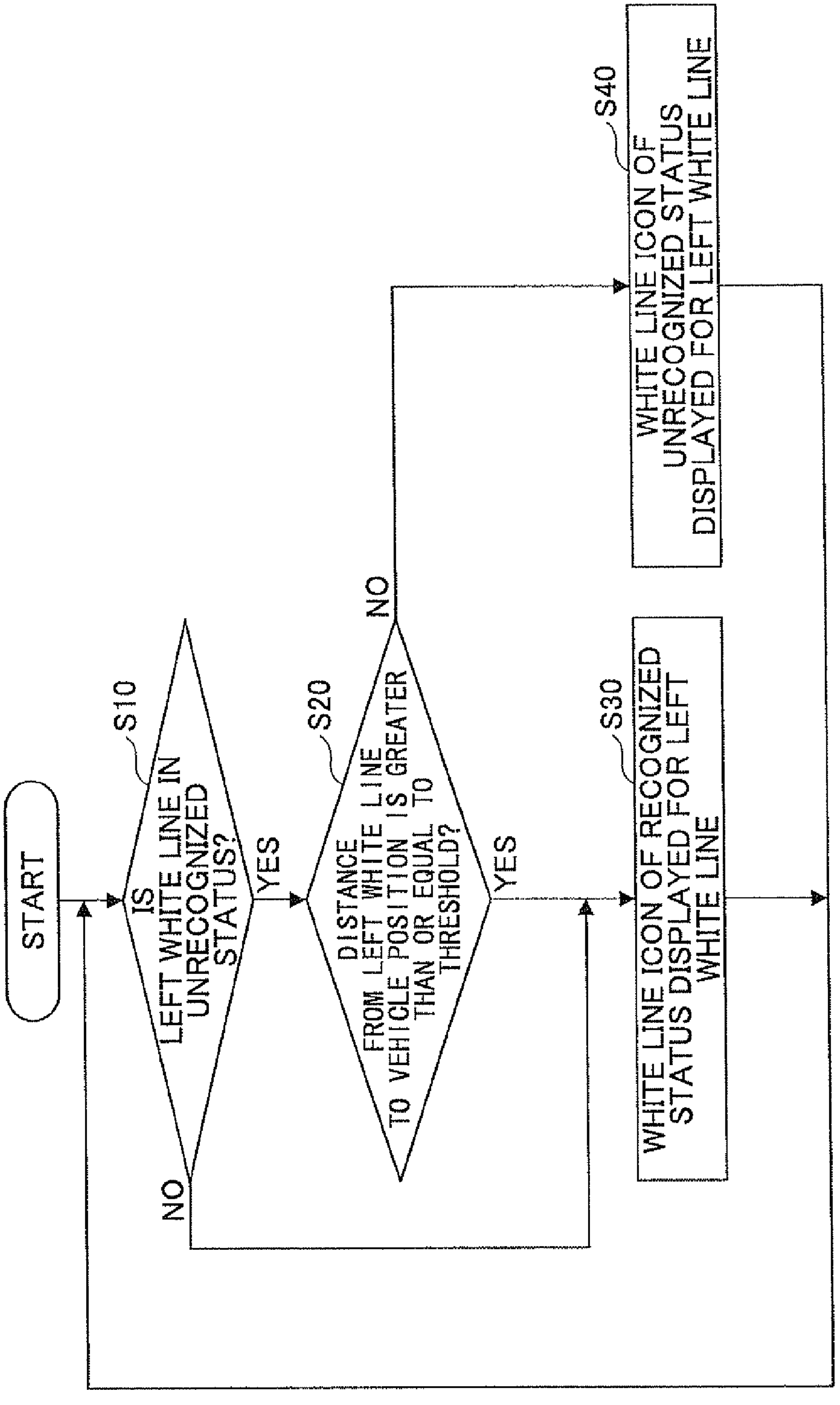
FIG. 10 is a flowchart for illustrating an example of a procedure by which the lane departure prevention support apparatus displays the white line recognition status.

FIG. 10 is a flowchart for illustrating an example of a procedure by which the lane departure prevention support apparatus 100 displays the white line recognition status. The procedure in FIG. 10 is executed repeatedly when the main SW 16 is turned on, for example.

To the departure prevention support ECU 12 is transmitted the white line information every time when the image data is captured. The unrecognized status determining part 41 determines whether the left white line becomes in the unrecognized status based on the white line recognition status included in the white line information.

If the left white line is not in the unrecognized status (No in S10), the display requesting part 43 transmits information, which indicates the recognized status as the white line recognition status of the left white line, to the meter ECU 13. In response to it, the display switching part 44 displays the white icon of the recognized status for the left white line (S30).

If the left white line is in the unrecognized status (Yes in S10), the distance determining part 42 determines whether a distance from the left white line to the host vehicle position is greater than or equal to a threshold (S20).

Figure 11A:
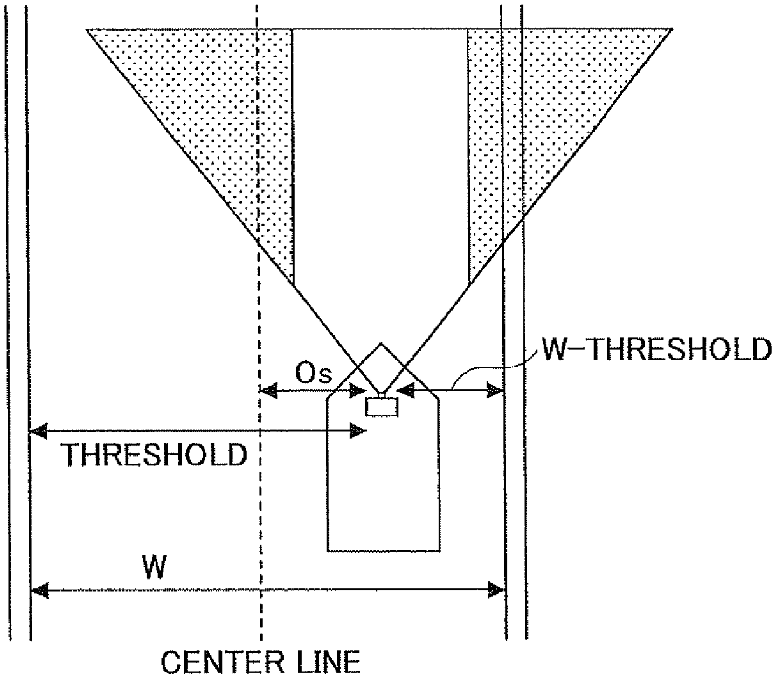
FIGS. 11A and 11B are diagrams for illustrating an example of a way of determining whether a distance from the left white line to a host vehicle position is greater than or equal to a threshold.
Figure 11B:
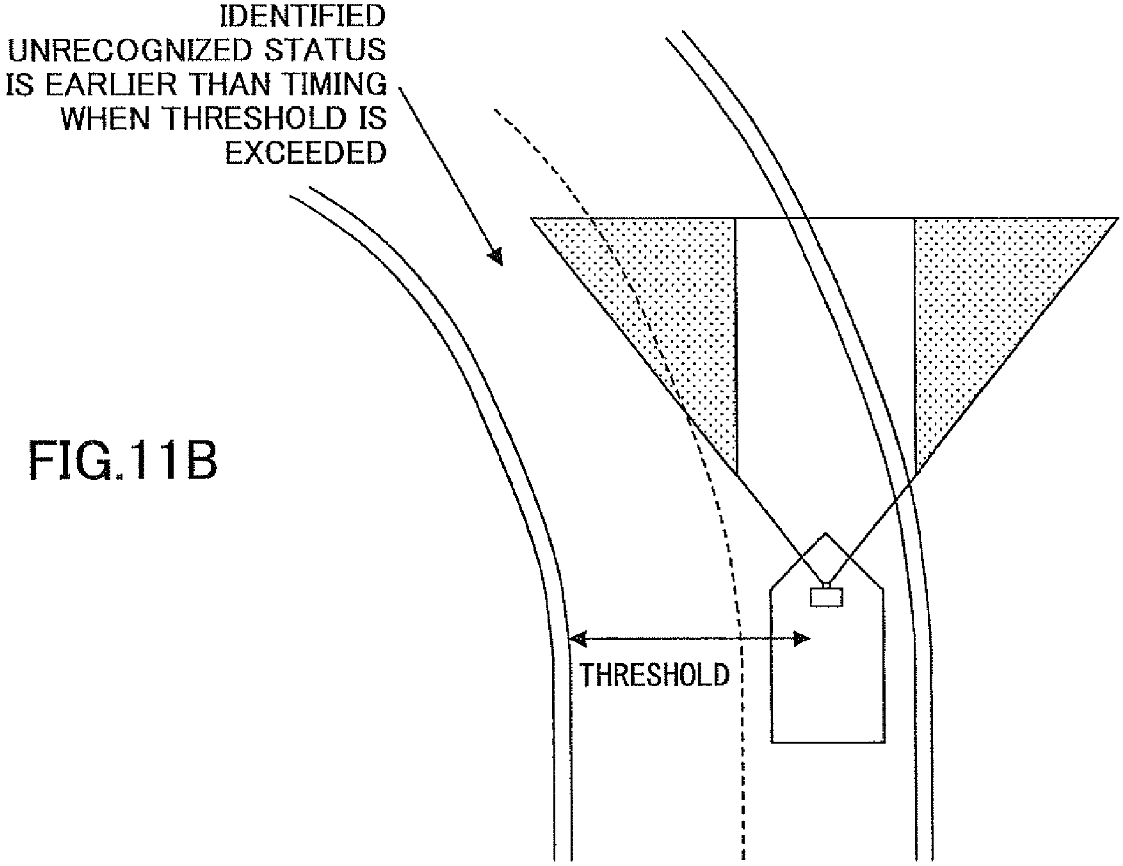

FIGS. 11A and 11B are diagrams for illustrating examples of this determination. Thanks to the white line information, the lane width W and the offset position Os are available to the distance determining part 42. It is assumed that the offset position Os in the right direction with respect to the center line is positive while the offset position Os in the left direction with respect to the center line is negative. In this case, the host vehicle position (corresponding to the position of the lane recognition camera 11 in this example; however, the host vehicle position may be designed as appropriate) is "W/2+Os" from the left white line. The distance determining part 42 compares this value with the threshold to determine whether the distance from the left white line to the host vehicle position is greater than or equal to the threshold.

The threshold corresponds to a distance at which the left white line becomes out of the left white line recognition area. Since the left white line recognition area is a fixed area, the position of the lane recognition camera 11 (=the threshold) at which the left white line becomes out of the left white line recognition area can be calculated. If the left white line recognition area is a fixed area, the threshold is constant regardless of the lane width or a vehicle width. Specifically, the threshold is about 3.5 through 4 m; however, this value may be designed as appropriate.

It is noted that since the white line is not recognized from the currently processed image data, there is a probability that the lane width W and the offset position Os are not included in the white line information when the left white line becomes unrecognized. In this case, the distance determining part 42 may utilize the white line information from the image data of the second latest frame.

Further, if the vehicle becomes closer to the left white line, the host vehicle position is "W2−Os" (Os is negative) from the right white line. The distance determining part 42 may determine, based on the white line which becomes in the unrecognized status, whether Os is added to W/2 or Os is subtracted from W/2 to calculate the distance. Alternatively, the distance determining part 42 may also determine based on whether Os is positive or negative, because the side to which the vehicle becomes closer can be determined based on whether Os is positive or negative.

Further, the distance determining part 42 may detect, based on a distance from the recognized white line to the host vehicle position instead of the position from the unrecognized white line (the further white line with respect to the host vehicle position) to the host vehicle position, that one of the left and right white lines is in the identified unrecognized status because the vehicle becomes closer to another white line. As illustrated in FIGS. 11A and 11B, when the distance from the unrecognized left white line to the host vehicle position is substantially the same as the threshold, the distance from the right white line to the host vehicle position is about "lane width W−threshold". Thus, if the lane width W is detected, the distance determining part 42 can determines that the vehicle becomes too close to the right white line based on the detected lane width W and the fixed threshold. In other words, if the distance from the right white line to the host vehicle position is smaller than "lane width W−threshold", it is determined that the left white line is in the identified unrecognized status.

Further, in S20, a determination criterion "the offset position Os is greater than or equal to a threshold" may be used instead of the determination criteria "the distance from the left white line to the host vehicle position is greater than or equal to the threshold". This is because the greater an absolute value of the offset position Os becomes, the higher the probability that the vehicle becomes closer to one of the left and right white lines becomes. In this case, as is the distance from the recognized white line to the host vehicle position, whether the white line is out of the white line recognition area depends on the lane width W. For this reason, the distance determining part 42 determines that one of the white lines is in the identified unrecognized status if "the threshold −W/2" is smaller than or equal to the absolute value of Os.

Further, as illustrated in FIG. 11B, with respect to the curved road, if the vehicle becomes closer to the side opposite to the center of the curvature, the white line recognition status becomes the identified unrecognized status earlier. For this reason, it is preferable to vary the threshold according to existence or absence of the curvature or the radius R. For example, the distance determining part 42 corrects the threshold if Os is positive (i.e., the vehicle becomes closer to the right white line) and the vehicle is on the left curve, or if Os is negative (i.e., the vehicle becomes closer to the left white line) and the vehicle is on the right curve. The threshold may be set such that the smaller the radius R is (i.e., the tighter the curve is), the smaller the threshold is. A correction formula is "threshold=threshold×k×R", for example. K is a coefficient for causing the radius R to have effect on the threshold. With this arrangement, even if the road ahead of the vehicle is curved, it is possible to detect the identified unrecognized status at an appropriate timing.

Returning to FIG. 10, if the distance from the left white line to the host vehicle position is greater than or equal to the threshold (Yes in S20), the display requesting part 43 transmits information, which indicates the recognized status as the white line recognition status of the left white line, to the meter ECU 13. In response to it, the display switching part 44 displays the white icon of the recognized status for the left white line (S30). Thus, the driver understands that the white line is recognized by the lane departure prevention support apparatus 100 as recognized by the driver when the driver sees the white line icon (recognized status) of the left white line, so that the driver is unlikely to feel strange.

If the distance from the left white line to the host vehicle position is not greater than or equal to the threshold (No in step 20), the display requesting part 43 transmits information, which indicates the unrecognized status as the white line recognition status of the left white line, to the meter ECU 13. In response to it, the display switching part 44 displays the white icon of the unrecognized status for the left white line (S40).

It is noted that if the lane departure prevention support apparatus 100 predicts that the vehicle departs from the traveling lane via the right white line, or if the vehicle actually departs from the traveling lane via the right white line, the white line icon of the warning operating status is displayed. The white line icon of the warning operating status is returned to the white line icon of the recognized status, the identified unrecognized status or the unrecognized status when the warning operating status is cleared.

Figure 12:
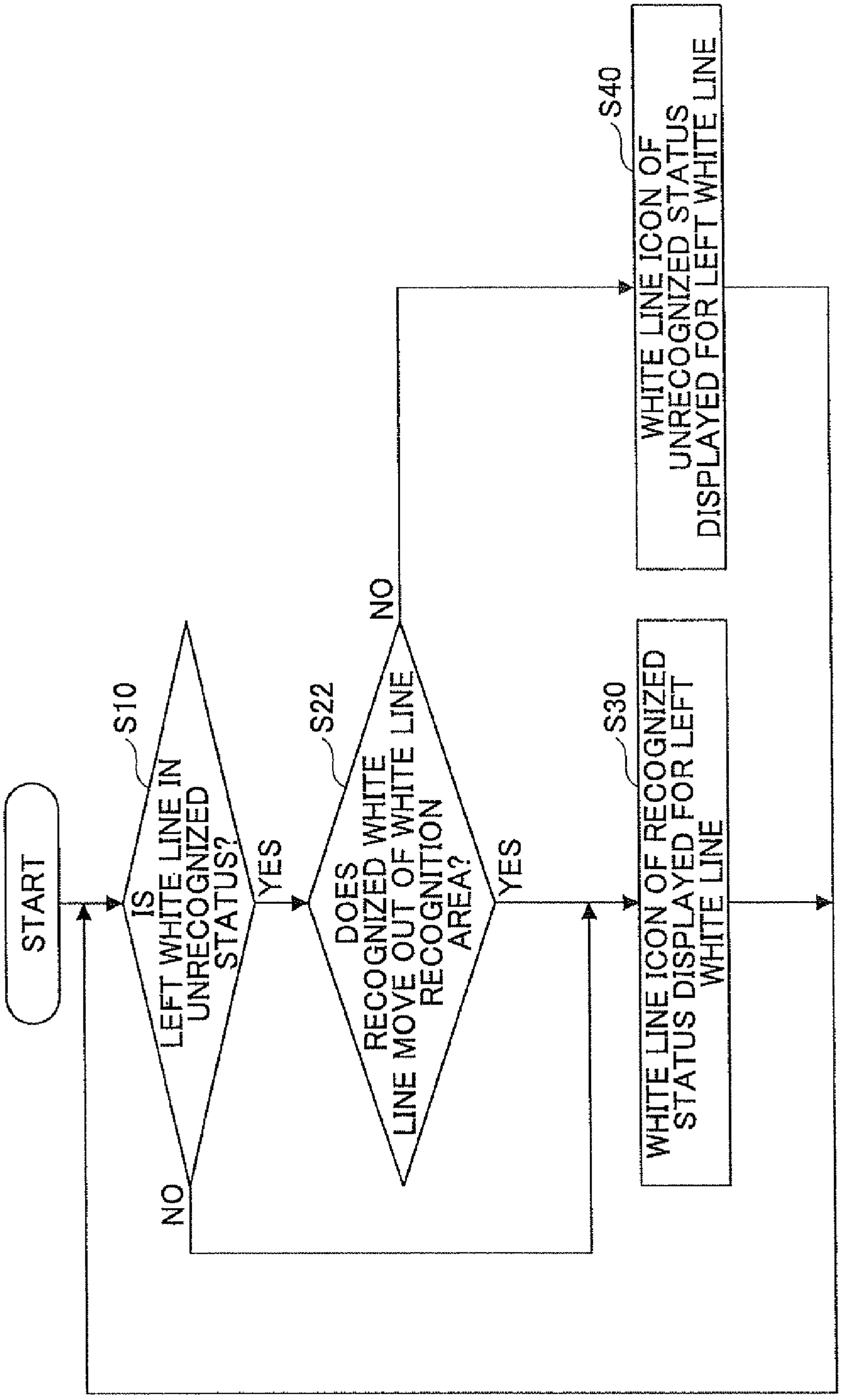
FIG. 12 is a flowchart for illustrating anther example of a procedure by which the lane departure prevention support apparatus displays the white line recognition status.

Next, a determination of the identified unrecognized status of the white line by the white line movement determining part 45 is described. FIG. 12 is a flowchart for illustrating another example of a procedure by which the lane departure prevention support apparatus 100 displays the white line recognition status. In FIG. 12, the explanation of the same steps as those in FIG. 11 is omitted. In FIG. 12, if the left white line is in the unrecognized status (Yes in S10), instead of the distance determining part 42 determining whether the distance from the left white line to the host vehicle position is greater than or equal to the threshold, the white line movement determining part determines whether the recognized white line moves out of the white line recognition area (S22).

Figure 13A:
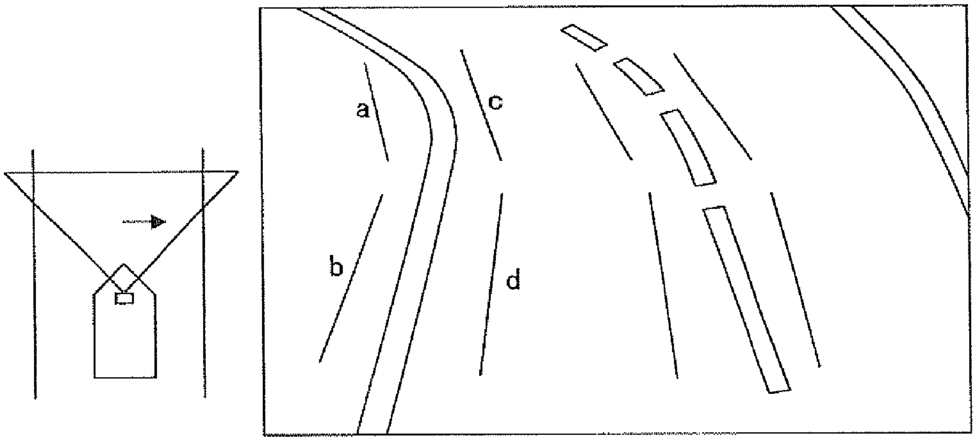
FIGS. 13A and 13B are diagrams for illustrating an example of a way of determining whether the recognized white line becomes out of the white line recognition area.
Figure 13B:
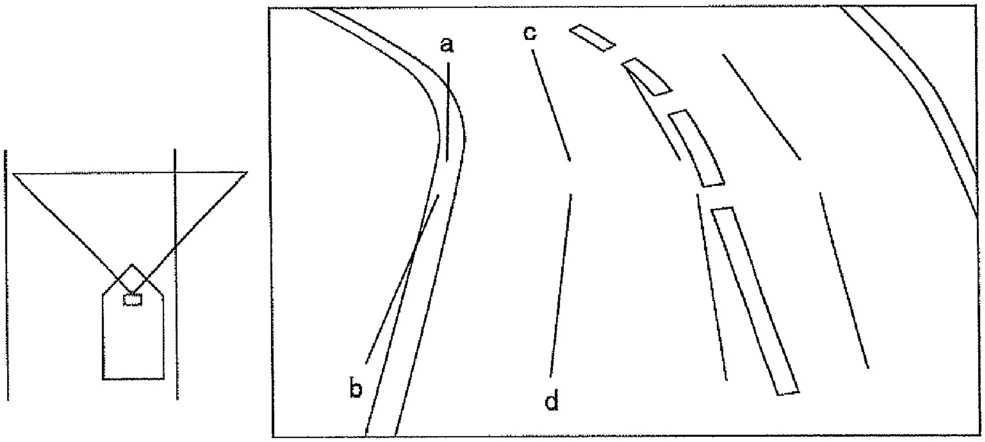

FIGS. 13A and 13B are diagrams for illustrating examples of this determination. As described above, the lane recognition camera 11 recognizes the white line using the left and right white line recognition areas. In FIGS. 13A and 13B, auxiliary lines a and b indicates the left end of the left white line recognition area, and auxiliary lines c and d indicates the left end of the right white line recognition area. As illustrated in FIG. 13A, when the vehicle travels near the center of the traveling lane, the left white line is within the auxiliary lines a through d. However, as illustrated in FIG. 13B, when the vehicle travels such that it is biased to the right white line, the left white line moves to the left side beyond the auxiliary lines a and b. Further, the left white line crosses the auxiliary lines a and b in the left direction in the course of changing from the status in FIG. 13A to the status in FIG. 13B.

The white line movement determining part 45 according to the present embodiment determines that the white line recognition status becomes the identified unrecognized status when it detects that the left white line crosses the auxiliary lines a and b in the left direction. Specifically, the offset amount Os and the white line recognition status included in the past white line information are used. In the course of the movement of the vehicle in the right direction, the offset amount Os (positive) is increased gradually. Further, the left white line remains in the recognized status until it becomes in the identified unrecognized status. Thus, since the last several offset amounts Os tend to increase immediately after the left line becomes in the identified unrecognized status, it is possible to detect that the left white line crosses the auxiliary lines a and b in the left direction. Further, a condition that the offset amount Os exceeds a predetermined value may be required to be met to determine that the left white line crosses the auxiliary lines a and b in the left direction.

Further, the determination of S20 in FIG. 10 and the determination of S22 in FIG. 12 may be combined. For example, if one of S20 and S22 is met, it may be determined that the white line recognition status is the identified unrecognized status, or both of S20 and S22 are met, it may be determined that the white line recognition status is the identified unrecognized status.

The subsequent process is the same as FIG. 10. Thus, the driver understands that the white line is recognized by the lane departure prevention support apparatus 100 as recognized by the driver when the driver sees the white line icon of the recognized status, so that the driver is unlikely to feel strange.

[Supplemental Explanation of Display Manner in Identified Unrecognized Status]

If the same white line icon is used in the recognized status and in the identified unrecognized status, there may be a case where the driver misunderstands that the white line is recognized even if the white line happens to be unrecognized during the identified unrecognized status. However, in fact, such a misunderstanding rarely causes a problem.

Figure 14A:
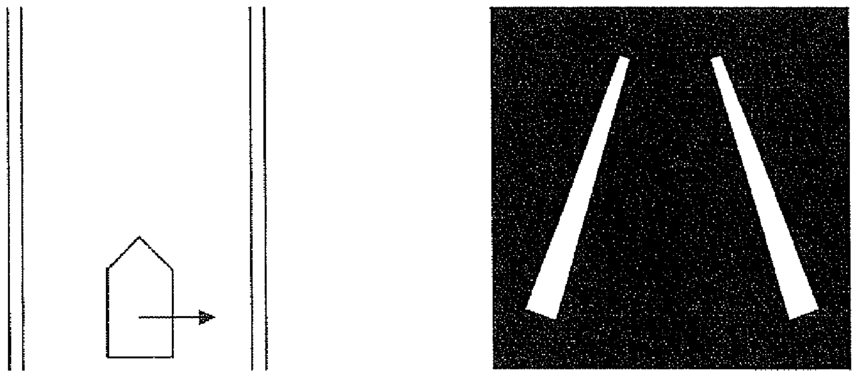
FIGS. 14A through 14C are diagrams for illustrating an example of the white line icon which changes over time.
Figure 14B:
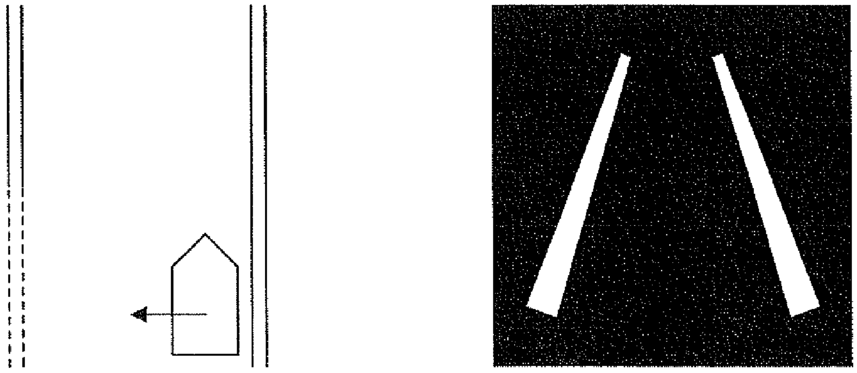
Figure 14C:
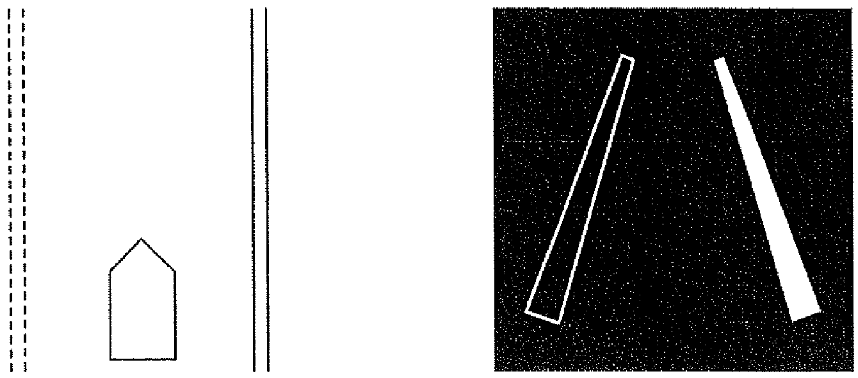

FIGS. 14A through 14C are diagrams for illustrating an example of the white line icon which changes over time. In FIG. 14A, since the vehicle travels near the center of the traveling lane, the white line icons of the recognized status are displayed with respect to the left and right white lines.

In FIG. 14B, when the vehicle becomes closer to the right white line, the lane departure prevention support apparatus 100 detects the identified unrecognized status with respect to the left white line, but the white line icon of the identified unrecognized status is the same as that of the recognized status. Then, during the identified unrecognized status, even if the left white line is unclear (i.e., the vehicle enters the unclear area), the white line icon of the recognized status remains displayed since the vehicle is still closer to the right white line.

In FIG. 14C, the vehicle returns near the center of the traveling lane. In this case, the lane departure prevention support apparatus 100 restarts the recognition of the left white line as soon as the left white line becomes within the left white line recognition area; however, the left white line is not recognized because the left white line is unclear. At that time, since the vehicle travels near the center of the traveling lane, the white line recognition status with respect to the left white line is not the identified unrecognized status. Thus, the lane departure prevention support apparatus 100 displays the white line icon of the unrecognized status with respect to the left white line.

Therefore, even if the driver feels strange because the unclear white line is recognized by the lane departure prevention support apparatus 100, the duration of such inconsistency can be short.

[Second Embodiment]

In the present embodiment, a lane departure prevention support apparatus 100 is described which displays the white line icon of the identified unrecognized status differently with respect to the first embodiment.

Figure 15A:
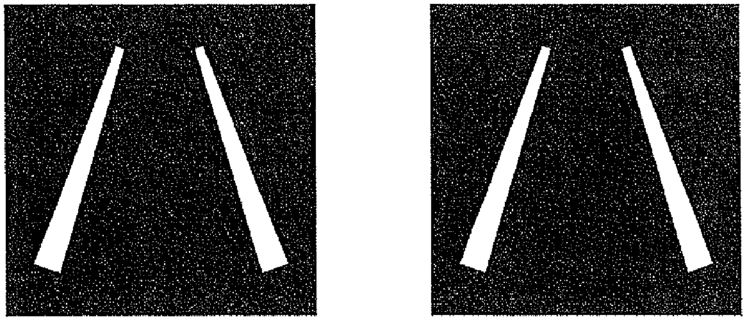
FIGS. 15A through 15D are diagrams for illustrating examples of a display manner according to the white line recognition status.
Figure 15B:
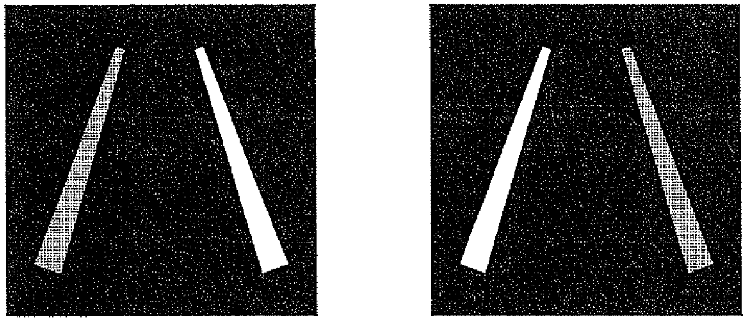
Figure 15C:
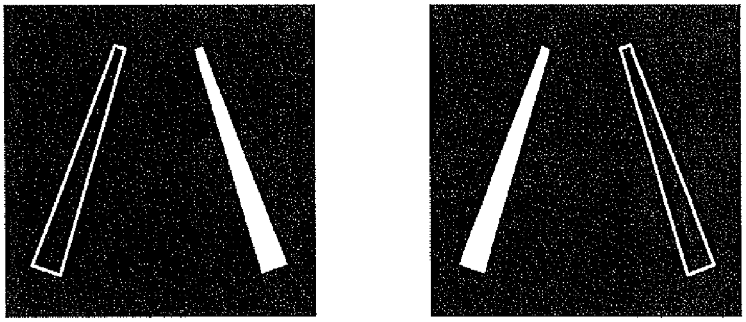
Figure 15D:
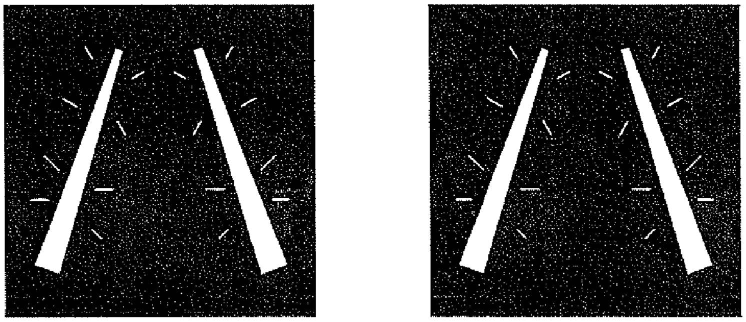

FIGS. 15A through 15D are diagrams for illustrating examples of a display manner of the white line icon according to a white line recognition status. As illustrated in FIG. 15A, in the recognized status, the left and right white lines are displayed using a white line icon which is white in a black background. Further, as illustrated in FIG. 15C, in the unrecognized status, the unrecognized white line is displayed using a white line icon whose inside is removed and thus only the frame (outline) thereof is left white. To the contrary, as illustrated in FIG. 15B, in the identified unrecognized status, the unrecognized white line is displayed using a white line icon which has an intermediate luminance value (a gray display) between white and black. The warning operating status is the same as the first embodiment.

In this way, by displaying the white line icon of the identified unrecognized status differently with respect to those of the recognized status and the unrecognized status, the lane departure prevention support apparatus 100 can notify the driver, with high reliability, of that the white line is not recognized because the vehicle becomes closer to left or right white line.

Figure 16A:
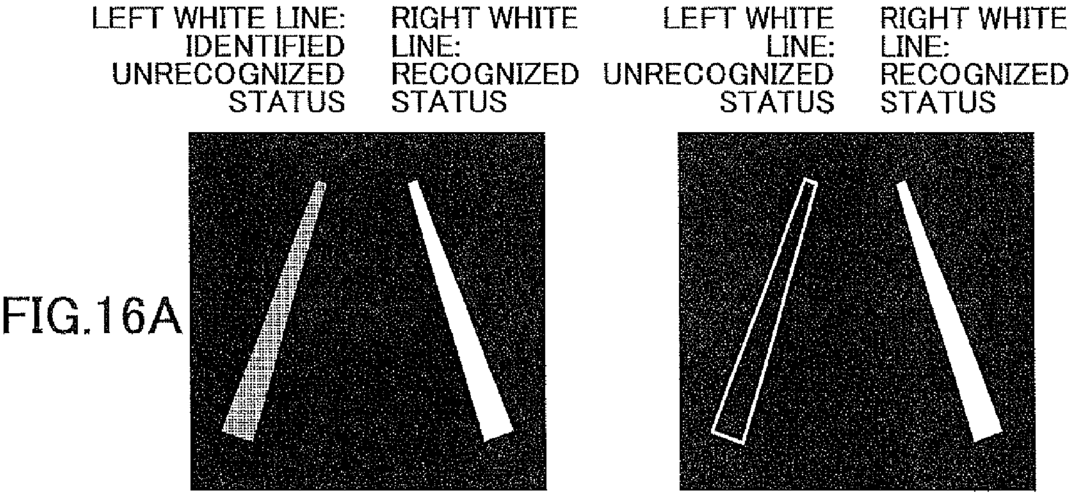
FIGS. 16A and 16B are diagrams for illustrating a display manner of an identified unrecognized status.
Figure 16B:
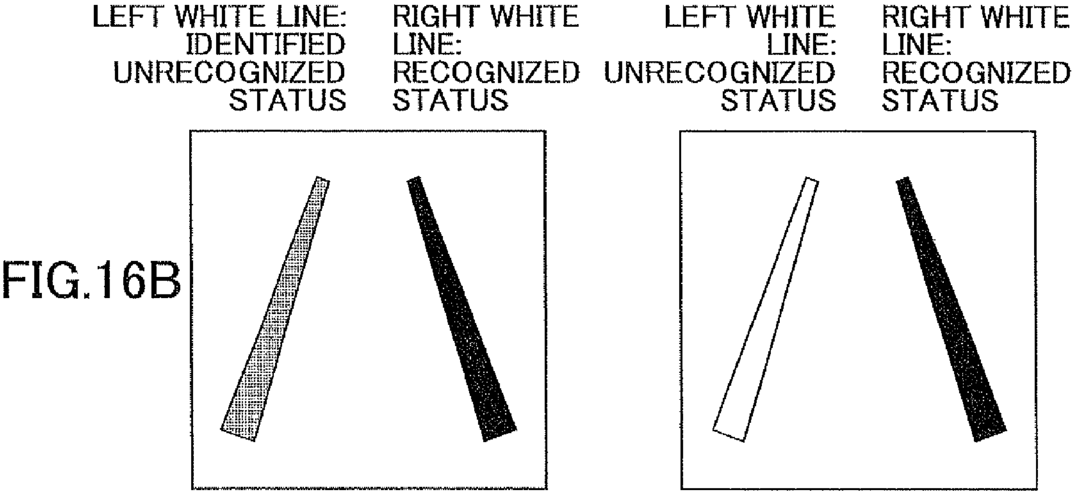

With reference to FIGS. 16A and 16B, the display manner of the white line icon of the identified unrecognized status is described. FIGS. 16A and 16B are diagrams for illustrating examples of the white line icon of the identified unrecognized status. The white line icons of the recognized status and the unrecognized status in FIG. 16A are the same as those in FIG. 9A, respectively. To the contrary, the white line icon of the identified unrecognized status is a so-called gray display which is not completely white (pixel value=255) or completely black (pixel value=0). There is the following ways of implementing the gray display.

(a) A ratio between the number of pixels which have the white pixel value (255, for example) and the number of pixels which have the black pixel value (0) is set such that it is greater than 0 percent and smaller than 100 percent. In other words, the white line icon is formed by mixing the white pixels and the black pixels.

(b) The white line icon is formed by pixels whose pixel values are greater than 0 and smaller than 255, for example.

Further, as illustrated in FIG. 16B, white and black may be reversed in the background and the white line icon. In FIG. 16B, the white line icon of the identified unrecognized status is a so-called gray display between white (pixel value=255) and black (pixel value=0). The way of implementing the gray display is the same as that described with reference to FIG. 16A.

It is noted that in FIGS. 16A and 16B, the concentration of the gray (how close to black or white) may be designed as appropriate. Further, the concentration of the gray may be different between the gray display in FIG. 16A and the gray display in FIG. 16B.

Figure 17:
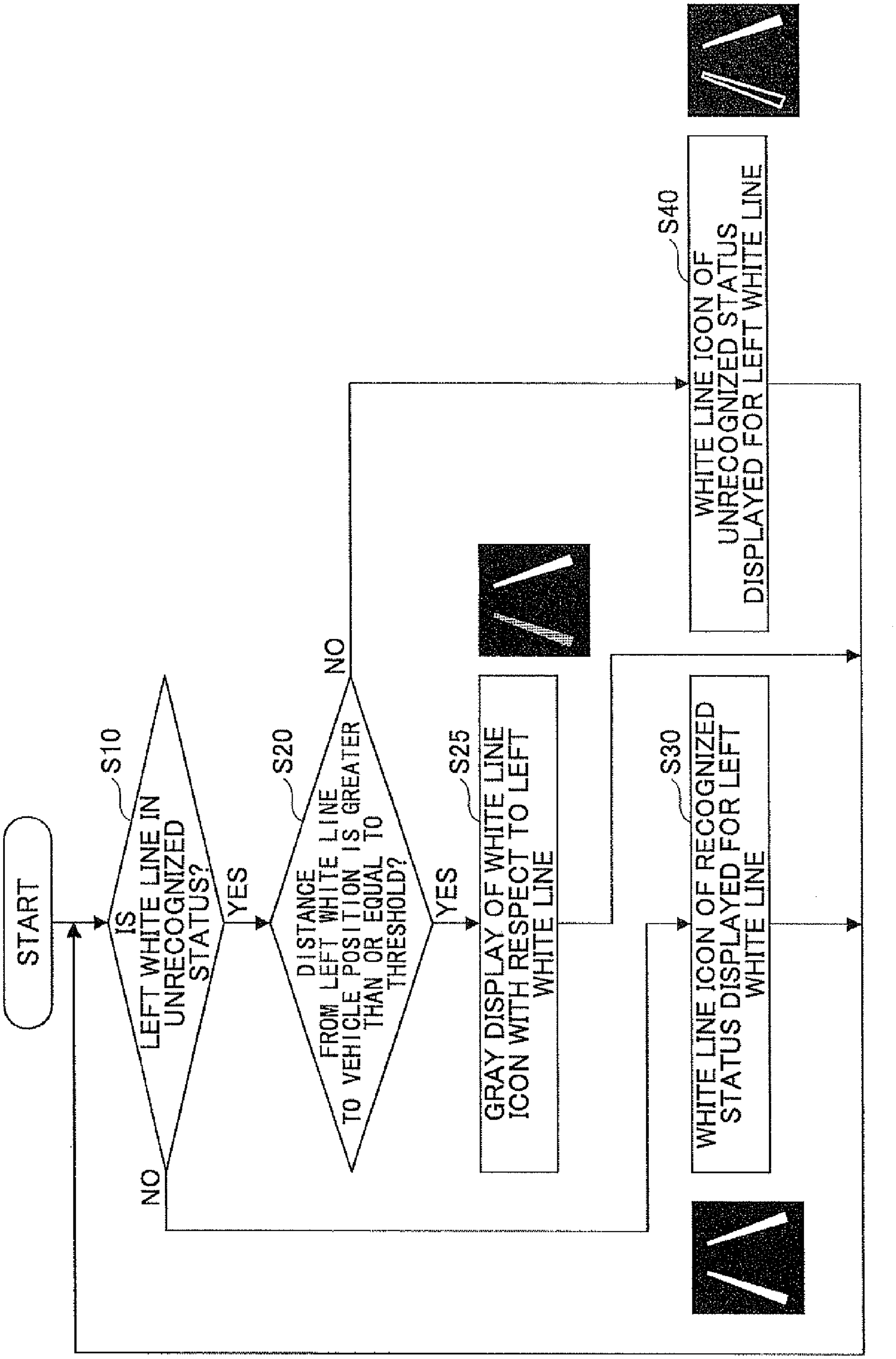
FIG. 17 is a flowchart for illustrating an example of a procedure by which the lane departure prevention support apparatus displays the white line recognition status.

FIG. 17 is a flowchart for illustrating an example of a procedure by which the lane departure prevention support apparatus 100 displays the white line recognition status. The procedure in FIG. 17 is executed repeatedly when the main SW 16 is turned on, for example. Also in the present embodiment, a case where the vehicle becomes closer to the right white line (i.e., the left white line becomes out of the left white line recognition area) is assumed as an example; however, a case where the vehicle becomes closer to the left white line is substantially the same (i.e., a left and right relationship is merely reversed).

According to the procedure illustrated in FIG. 17, in step S20 if the distance from the left white line to the host vehicle position is greater than or equal to the threshold (Yes in S20), the display requesting part 43 transmits information, which indicates the identified unrecognized status as the white line recognition status of the left white line, to the meter ECU 13. In response to it, the display switching part 44 displays the gray display as illustrated in FIGS. 16A and 16B as the white icon of the identified unrecognized status for the left white line (S25).

The white icon of the recognized status (S30) and the white icon of the unrecognized status (S40) are the same as those in the first embodiment. Further, the determination of step S20 may be replaced with the determination of S22 in FIG. 12 or combined with the determination of S22 in FIG. 12.

By displaying the white line icon differently in the recognized status, the identified unrecognized status and unrecognized status, the driver can understand with high reliability that the left white line, which is recognized by the driver, is not recognized by the lane departure prevention support apparatus 100 because the left white line is out of the white line recognition area.

[Examples of Gray Display]

Figure 18A:
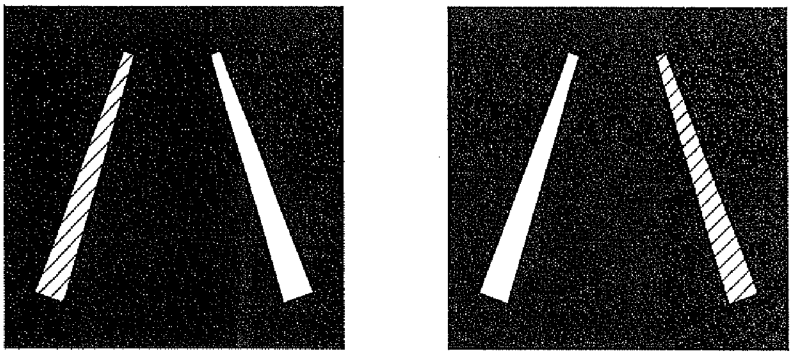
FIGS. 18A through 18C are diagrams for illustrating other examples of a gray display of the identified unrecognized status.
Figure 18B:
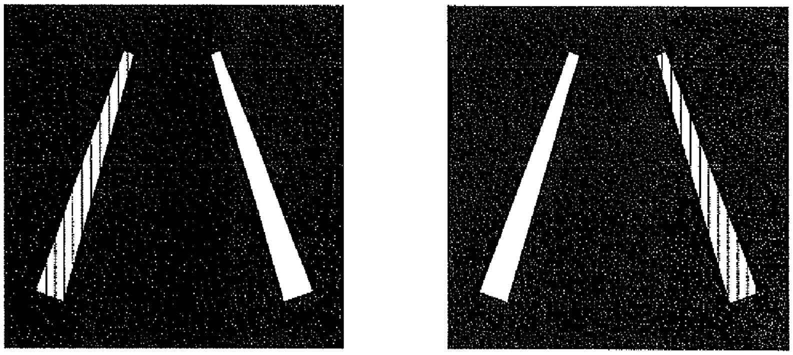
Figure 18C:
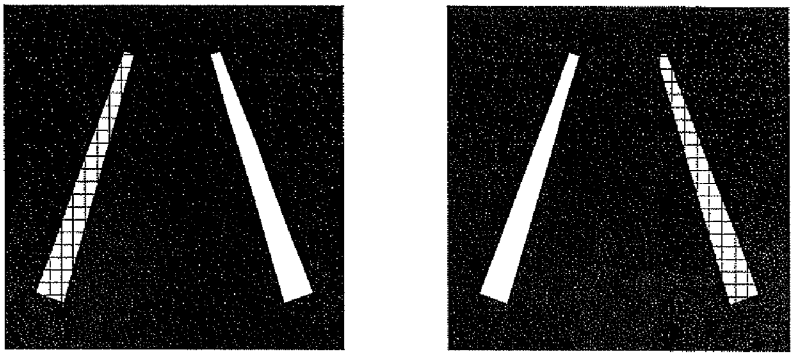

The gray display of the white line icon indicating the identified unrecognized status may be various because it may be different from those of the recognized status and the unrecognized status. FIGS. 18A through 18C are diagrams for illustrating other examples of the gray display of the white line icon of the identified unrecognized status. In FIG. 18A the gray display of the white line icon is implemented by oblique lines, in FIG. 18B the gray display of the white line icon is implemented by vertical lines, and FIG. 18C the gray display of the white line icon is implemented by grid patterned lines.

Further, if the information display part 21 can display a color image, it is also possible to change not only luminance but also chroma saturation to make the white line icon of the identified unrecognized status, the white line icon of the recognized status and the white line icon of the unrecognized status distinguishable.

FIGS. 19A through 19F are diagrams for illustrating examples of the white line icons of the identified unrecognized status, a recognized status and an unrecognized status whose colors are different. As illustrated in FIG. 19A, the white line icon of the recognized status is blue or green, for example. Further, as illustrated in FIG. 19B, the white line icon of the identified unrecognized status is yellow, for example. Further, as illustrated in FIG. 19C, the white line icon of the unrecognized status is red, for example. It is noted that the background color may be arbitrary, such as white, black, gray and beige, as long as it is different from the colors of the white line icons.

Further, the width (thickness) of the line may be varied between the white line icons of the recognized status, the identified unrecognized status, and the unrecognized status. As illustrated in FIG. 19D, the white line icon of the recognized status is formed by a thick white line, for example. Further, as illustrated in FIG. 19E, the white line icon of the identified unrecognized status has an intermediate width, for example. Further, as illustrated in FIG. 19F, the white line icon of the unrecognized status is formed by a thin white line, for example.

Further, a type of the line may be varied between the white line icons of the recognized status, the identified unrecognized status, and the unrecognized status. As illustrated in FIG. 20A, the white line icon of the recognized status is formed by a thick white line, for example. Further, as illustrated in FIG. 20B, the white line icon of the identified unrecognized status is formed by a thin white line, for example.

Further, as illustrated in FIG. 20C, the white line icon of the unrecognized status is formed by a dotted white line, for example. Further, the number of the white lines which form the white line icon may be varied between the white line icons of the identified unrecognized status and the unrecognized status. For example, the number of the white lines which form the white line icon of the unrecognized status is smaller than that of identified unrecognized status.

Further, as illustrated in FIG. 20D, the white line icon of the recognized status may be formed by a thick white line, for example. Further, as illustrated in FIG. 20E, the white line icon of the identified unrecognized status may be formed by a thin white line, for example. Further, as illustrated in FIG. 20F, the white line icon of the unrecognized status which is the same as a black background may be displayed.

Further, the white line icon of the identified unrecognized status and the white line icon of the unrecognized status may be the same. In this case, one of the white line icons of the identified unrecognized status and the unrecognized status may be flashed on and off to display the white line icons of the identified unrecognized status and the unrecognized status differently.

As described above, in the lane departure prevention support apparatus according to the present embodiment, even if one of the white lines cannot be recognized, the white line icon of the identified unrecognized status is displayed in the same manner as that of the recognized status, or displayed differently with respect to those of the recognized status and the unrecognized status, thereby reducing the strange feeling of the driver.

What is claimed is:

1. A lane departure prevention support apparatus, comprising:

an imaging device configured to capture an image of a lane boundary sign which defines a lane in which a vehicle is traveling;

a display apparatus configured to recognize the lane boundary sign from captured image data and display the lane boundary sign according to a recognition result and a host vehicle position; and a vehicle position detecting part configured to detect the host vehicle position within the traveling lane, wherein the lane departure prevention support apparatus is configured to prevent a departure from the traveling lane, wherein the display apparatus is configured such that under a status in which the lane boundary sign is not recognized, if the host vehicle is closer to one lane boundary sign of left and right lane boundary signs of the traveling lane and another lane boundary sign of the traveling lane is unrecognized, the display apparatus indicates a status in which the lane boundary signs are recognized, and under the status in which the lane boundary sign is not recognized, if the host vehicle is not closer to one lane boundary sign of the left and the right lane boundary signs of the traveling lane, the display apparatus indicates a status in which the lane boundary sign is not recognized.

2. The lane departure prevention support apparatus of claim 1, wherein if a farther lane boundary sign with respect to the host vehicle position recognized by the vehicle position detecting part is not recognized, the display apparatus indicates a status in which the farther lane boundary sign with respect to the host vehicle position is recognized.

3. The lane departure prevention support apparatus of claim 2, further comprising a distance detecting part configured to detect, based on the host vehicle position recognized by the vehicle position detecting part and a lane width of the traveling lane, a first distance from the farther lane boundary sign with respect to the host vehicle position to the host vehicle position, wherein if the first distance is greater than or equal to a threshold, the display apparatus indicates a status in which the farther lane boundary sign with respect to the host vehicle position is recognized.

4. The lane departure prevention support apparatus of claim 3, wherein the distance detecting part detects, based on the host vehicle position recognized by the vehicle position detecting part and a lane width of the traveling lane, a second distance from a nearer lane boundary sign with respect to the host vehicle position to the host vehicle position, or a departure amount of the host vehicle position with respect to a center line of the traveling lane, and if the second distance is less than a value of (the lane width)−(the threshold) or the departure amount is greater than or equal to a value of (the threshold)−(the lane width)/2, the display indicates a status in which the farther lane boundary sign with respect to the host vehicle position is recognized.

5. The lane departure prevention support apparatus of claim 2, wherein if the display apparatus detects that the recognized lane boundary sign has moved out of a recognition area from a right end or a left end of the recognition area, the display apparatus determines the moved lane boundary sign as the farther lane boundary sign with respect to the host vehicle position, the recognition area being set in the captured image data for recognizing the lane boundary sign.

6. The lane departure prevention support apparatus of claim 3, wherein if the display apparatus detects that the recognized lane boundary sign has moved out of a recognition area from a right end or a left end of the recognition area, the display apparatus determines the moved lane boundary sign as the farther lane boundary sign with respect to the host vehicle position, the recognition area being set in the captured image data for recognizing the lane boundary sign.

7. The lane departure prevention support apparatus of claim 4, wherein if the display apparatus detects that the recognized lane boundary sign has moved out of a recognition area from a right end or a left end of the recognition area, the display apparatus determines the moved lane boundary sign as the farther lane boundary sign with respect to the host vehicle position, the recognition area being set in the captured image data for recognizing the lane boundary sign.

8. The lane departure prevention support apparatus of claim 1, wherein if the host vehicle becomes closer to one of the left and the right lane boundary signs of the traveling lane more than a threshold, the display apparatus indicates a status in which the lane boundary sign, which is opposite to the closer lane boundary sign, is recognized.

9. The lane departure prevention support apparatus of claim 1, wherein if the host vehicle is away from another of the left and the right lane boundary signs of the traveling lane more than a threshold, the display apparatus indicates a status in which the lane boundary sign, which is away from the host vehicle, is recognized.

10. A lane departure prevention method, comprising:

capturing an image of a lane boundary sign which defines a traveling lane in which a host vehicle is traveling;

recognizing the lane boundary sign from captured image data, detecting a host vehicle position within the traveling lane;

under a status in which the lane boundary sign is not recognized, indicating a status in which the lane boundary signs are recognized, if the host vehicle is closer to one lane boundary sign of left and right lane boundary signs of the traveling lane and another lane boundary sign of the traveling lane is unrecognized, under a status in which the lane boundary sign is not recognized, indicating a status in which the lane boundary sign is not recognized, if the host vehicle is not closer to one lane boundary sign of the left and the right lane boundary signs of the traveling lane; and preventing a departure of the host vehicle from the traveling lane according to the host vehicle position.

11. A non-transitory recording medium on which a program is stored for causing a computer to capture an image of a lane boundary sign which defines a traveling lane in which a host vehicle is traveling;

recognize the lane boundary sign from captured image data, detect a host vehicle position within the traveling lane;

under a status in which the lane boundary sign is not recognized, indicate a status in which the lane boundary signs are recognized, if the host vehicle is closer to one lane boundary sign of left and right lane boundary signs of the traveling lane and another lane boundary sign of the traveling lane is unrecognized, under a status in which the lane boundary sign is not recognized, indicate a status in which the lane boundary sign is not recognized, if the host vehicle is not closer to one lane boundary sign of the left and the right lane boundary signs of the traveling lane; and prevent a departure of the host vehicle from the traveling lane according to the host vehicle position.

* * * * *